United States Patent
Kong et al.

(10) Patent No.: US 8,055,699 B2
(45) Date of Patent: Nov. 8, 2011

(54) APPARATUS AND METHOD FOR INTERFACING IN A COMMUNICATION SYSTEM

(75) Inventors: Dong-Keon Kong, Suwon-si (KR); Sung-Won Lee, Seongnam-si (KR); Dae-Seok Kim, Seoul (KR); Young-Ky Kim, Seoul (KR); Joon-Ho Park, Seongnam-si (KR); Poong-Ki Min, Suwon-si (KR); Sang-Jun Moon, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 1072 days.

(21) Appl. No.: 11/865,507

(22) Filed: Oct. 1, 2007

(65) Prior Publication Data

US 2008/0082990 A1    Apr. 3, 2008

(30) Foreign Application Priority Data

Sep. 30, 2006  (KR) .................. 10-2006-0096687
Apr. 27, 2007  (KR) .................. 10-2007-0041077

(51) Int. Cl.
    *G06F 15/16* (2006.01)
(52) U.S. Cl. ........ 709/201; 709/202; 709/204; 709/218; 370/328; 370/338
(58) Field of Classification Search ........... 709/201–207
    See application file for complete search history.

(56) References Cited

U.S. PATENT DOCUMENTS

| 6,169,899 | B1 * | 1/2001 | Havinis et al. ............... 455/433 |
| 6,185,565 | B1 | 2/2001 | Meubus et al. |
| 6,199,045 | B1 | 3/2001 | Giniger et al. |
| 6,680,694 | B1 | 1/2004 | Knockeart et al. |
| 2002/0065944 | A1 * | 5/2002 | Hickey et al. ................. 709/310 |
| 2002/0073356 | A1 * | 6/2002 | Katayama et al. ................. 714/4 |
| 2002/0077897 | A1 * | 6/2002 | Zellner et al. ................... 705/14 |
| 2003/0104827 | A1 * | 6/2003 | Moran et al. ................... 455/466 |
| 2004/0094235 | A1 * | 5/2004 | Rodzewich et al. .......... 148/243 |
| 2006/0107088 | A1 * | 5/2006 | Katayama et al. ................ 714/4 |
| 2006/0246918 | A1 * | 11/2006 | Fok et al. ................... 455/456.1 |
| 2007/0032989 | A1 * | 2/2007 | Hodges et al. ................ 702/188 |
| 2007/0182567 | A1 * | 8/2007 | Stewart et al. ............. 340/572.8 |
| 2007/0254638 | A1 * | 11/2007 | Coppinger et al. .......... 455/418 |
| 2008/0137624 | A1 * | 6/2008 | Silverstrim et al. ........... 370/338 |

FOREIGN PATENT DOCUMENTS

| EP | 1 372 309 | 12/2003 |
| EP | 1 494 419 | 1/2005 |

* cited by examiner

*Primary Examiner* — Wing Chan
*Assistant Examiner* — Razu Miah
(74) *Attorney, Agent, or Firm* — The Farrell Law Firm, P.C.

(57) ABSTRACT

Disclosed is a method for interfacing in a communication system. The method includes receiving an event, which should be processed using information managed by a second system providing a second service, from a first system providing a first service; and performing an interface so that the second system performs an operation corresponding to the event by using the information.

10 Claims, 16 Drawing Sheets

|  | Server Name (or IP Address) | Serviced User/Device Range | Other Information |
|---|---|---|---|
| Location Server | A.A.A.A | ALL | .... |
| Device Capability Server | B.B.B.B | ALL | .... |
| User Profile Server #1 | C1.C1.C1.C1 | ODD | .... |
| User Profile Server #n | C2.C2.C2.C2 | EVEN | .... |
| Paging Server | D.D.D.D | ALL | .... |
| QoS Server | E.E.E.E | ALL | .... |

FIG.10

| Transaction Code | ISP/ICP A/S Name (or IP Address) | Server Name (or IP Address) | Other Information |
|---|---|---|---|
| 0x0110 | x.x.x.x | A.A.A.A | .... |
| 0x0010 | y.y.y.y | C.C.C.C | .... |
| 0x1010 | q.q.q.q | G.G.G.G | .... |
| 0x1110 | e.e.e.e | R.R.R.R | .... |
| .... | . | .... | .... |
| 0xAF01 | p.p.p.p | W.W.W.W | .... |

FIG.11

| APPLICATION SERVER | Transaction Type | Date/Time | Detail Information |
|---|---|---|---|
| AAA | QoS | A.A.A.A | .... |
| BBB | Location | C.C.C.C | .... |
| CCC | User Profile | G.G.G.G | .... |
| DDD | Device Capa | R.R.R.R | .... |
| .... | . | .... | .... |
| EEE | Paging | W.W.W.W | .... |

FIG.15

APPARATUS AND METHOD FOR INTERFACING IN A COMMUNICATION SYSTEM

PRIORITY

This application claims the priority under 35 U.S.C. §119 (a) to Korean Patent Applications filed in the Korean Intellectual Property Office on Sep. 30, 2006 and Apr. 27, 2007 and assigned Serial Nos. 2006-96687 and 2007-41077, the contents of which are incorporated herein by reference.

BACKGROUND OF THE INVENTION

1. Field of the Invention

The present invention relates to an apparatus and a method for interfacing in a communication network, and in particular, to an apparatus and a method for interfacing between a mobile communication system and an Internet service/content providing system.

2. Description of the Related Art

In general, mobile communication systems are being developed today to provide a wider variety of services to Mobile Stations (MSs). For example, mobile communication systems research is being directed toward delivering a wider variety of services, such as Internet service and content, to the MSs. In this case, the Internet services and content are typically provided by an Internet service/content providing system.

Currently, the mobile communication system and the Internet service/content providing system are independently operated. As such, the mobile communication system cannot use the Internet service/content-related information managed by the Internet service/content providing system, and the Internet service/content providing system cannot use mobile communication-related information managed by the mobile communication system. Therefore, the mobile communication system is limited in the services that can be provided by the mobile communication system because the mobile communication system cannot use the Internet service/content-related information managed by the Internet service/content providing system as described above. On the other hand, the Internet service/content providing system is also limited in the services that can be provided by the Internet service/content providing system because the Internet service/content providing system cannot use mobile communication-related information managed by the mobile communication system as described above.

SUMMARY OF THE INVENTION

An aspect of the present invention is to substantially solve the above-mentioned problems and/or disadvantages and to provide at least the advantages below. Accordingly one aspect of the present invention is to provide an apparatus and a method for interfacing in a communication network.

Another aspect of the present invention is to provide an apparatus and a method for interfacing between a mobile communication system and an Internet service/content providing system.

According to one aspect of the present invention, there is provided a method for interfacing in a communication system. The method includes receiving an event, which should be processed using information managed by a second system providing a second service, from a first system providing a first service; and performing an interface so that the second system performs an operation corresponding to the event by using the information.

According to another aspect of the present invention, there is provided an apparatus for interfacing in a communication system. The apparatus includes a service interface server for receiving an event, which should be processed using information managed by a second system providing a second service, from a first system providing a first service, and performing an interface so that the second system performs an operation corresponding to the event by using the information.

BRIEF DESCRIPTION OF THE DRAWINGS

The above and other aspects, features and advantages of the present invention will be more apparent from the following detailed description taken in conjunction with the accompanying drawings, in which:

FIG. 10 illustrates an internal information structure of the message routing database 913 of FIG. 9 according to the present invention;

FIG. 11 illustrates an internal information structure of the transaction log database 911 of FIG. 9 according to the present invention;

FIG. 15 illustrates an internal information structure of the application server billing database 1411 of FIGS. 14A and 14B according to the present invention.

DETAILED DESCRIPTION OF THE PREFERRED EMBODIMENTS

Hereinafter, exemplary embodiments of the present invention will be described with reference to the accompanying drawings. In the following description, a detailed description of known functions and configurations incorporated herein will be omitted when it may make the subject matter of the present invention rather unclear.

The present invention provides an apparatus and a method for interfacing in a communication network. Specifically, the present invention provides an apparatus and a method for interfacing between a mobile communication system and an Internet service/content providing system as an example, although it is natural that the present invention can be applied to interfacing between two systems providing different services, as well as between the mobile communication system and the Internet service/content providing system.

Figure 1:
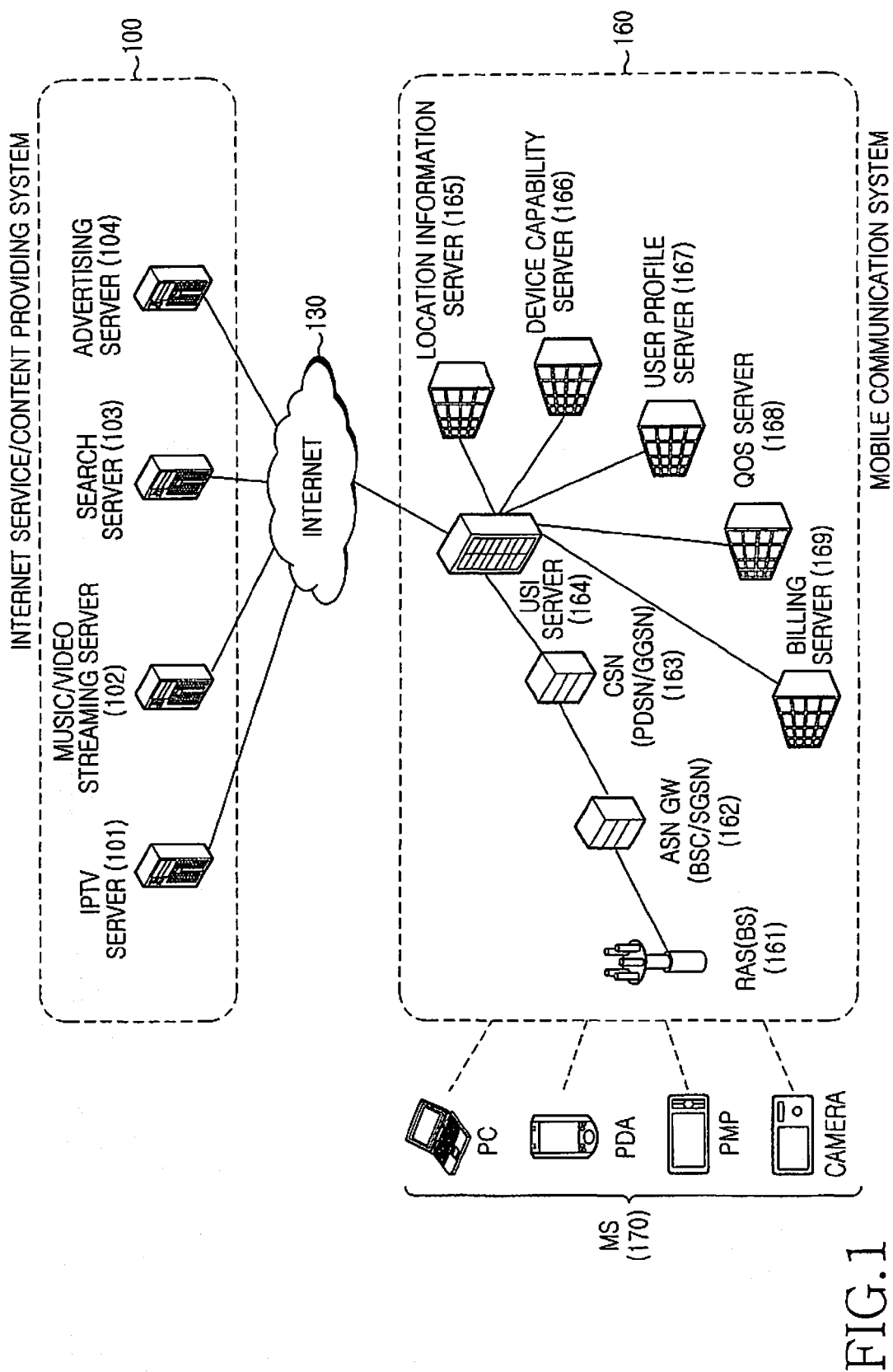
FIG. 1 illustrates a structure of a communication network for interfacing between a mobile communication system and an Internet service/content providing system according to the present invention.

FIG. 1 illustrates a structure of a communication network for interfacing between a mobile communication system and an Internet service/content providing system according to the present invention.

In FIG. 1, the communication network includes an Internet service/content providing system 100, a mobile communication system 160, and a Mobile Station (MS) 170, such as a laptop Personal Computer (PC), a Personal Digital Assistant (PDA), a Portable Multimedia Player (PMP), and a camera. The Internet service/content providing system 100 and the mobile communication system 160 are connected to each other through the Internet 130. For convenience of description, the MS is also called a user or subscriber in the following description.

The Internet service/content providing system 100 includes various application servers for providing various Internet services and contents. Specifically, referring to FIG. 1, the application servers of the Internet service/content providing system 100 include an Internet Protocol Television (IPTV) server 101, a music/video streaming server 102, a search server 103, and an advertising server 104. The IPTV server 101 provides an IPTV service, the music/video streaming server 102 provides a music/video streaming service, the search server 103 provides a search service, and the advertising server 104 provides an advertising service.

Further, the mobile communication system 160 includes a Radio Access System (RAS) 161, an Access Service Network Gateway (ASN GW) 162, a Core Service Network (CSN) 163, a Universal Service Interface (USI) server 164, a location information server 165, a device capability server 166, a user profile server 167, a Quality of Service (QoS) server 168, and a billing server 169. Although the USI server 164 is implemented as a separate unit in the mobile communication system 160 shown in FIG. 1, it goes without saying that the USI server 164 may be implemented as an internal unit of the ASN GW 162 or the CSN 163.

The RAS 161, the ASN GW 162, and the CSN 163 are the same as those of a typical mobile communication system, so a detailed description thereof is omitted here. The USI server 164 performs interfacing between the Internet service/content providing system 100 and the mobile communication system 160. The type of the interfacing performed by the USI server 164 will be described later in detail.

The location information server 165 manages location information of the MS 170. The device capability server 166 manages information on a device capability of the MS 170. The device capability information includes the type of the MS 170, a resolution provided by the MS 170, CODEC support information, etc. The user profile server 167 manages a user profile, the QoS server 168 manages QoS-related information that must be provided to the MS 170, and the billing server 169 manages billing information for the MS 170 or the Internet service/content providing system 100.

Hereinafter, the types of interfaces performed by the USI server 164 of FIG. 1 will be described with reference to FIG. 2.

Figure 2:
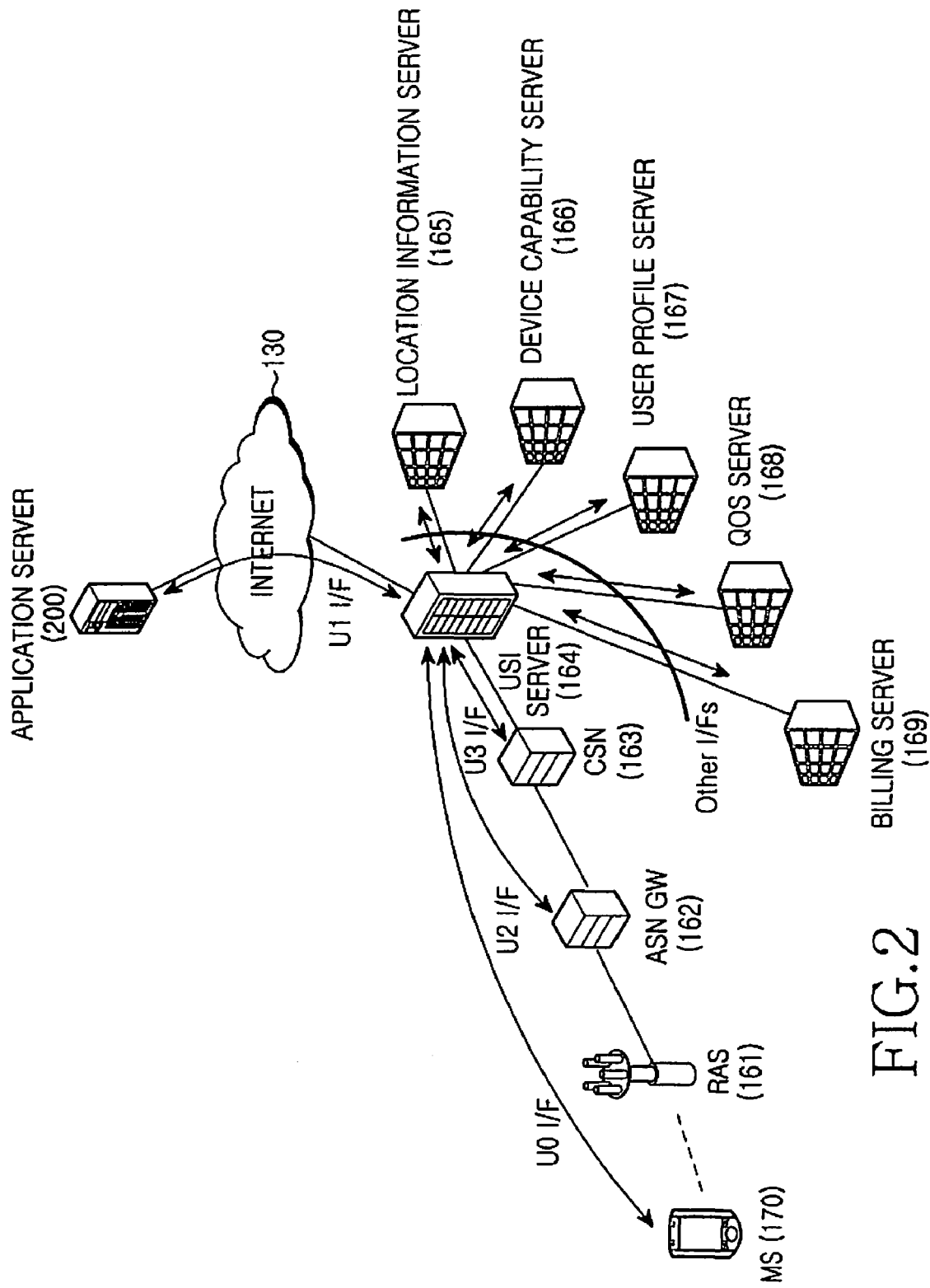
FIG. 2 is a block diagram illustrating the types of interfaces performed by the USI server 164 of FIG. 1 according to the present invention.

FIG. 2 is a block diagram illustrating the types of interfaces performed by the USI server 164 of FIG. 1.

In FIG. 2, the types of interfaces performed by the USI server 164 of FIG. 1 include a total of nine types, which are described below.

(1) U0 Interface (U0 I/F)

The U0 I/F is an interface between the MS 170 and the USI server 164, which employs an HTTP/XML (eXtensible Markup Language) protocol. Further, the U0 I/F has the following function.

<Function>
User-requested network information request/report (2) U1 Interface (U1 I/F)

The U1 I/F is an interface between the USI server 164 and a predetermined application server 200 included in the Internet service/content providing system 100, which employs an HTTP/XML/SOAP (Simple Object Access Protocol). Further, the U1 I/F has the following functions.

<Functions>
Content access authorization
User/Device information retrieval
Subscriber location information retrieval
Subscriber location tracking request
Subscriber location report
QoS requirement enforcement
Accounting information exchange
Server triggered paging transaction
User profile retrieval Hereinafter, the functions of U1 I/F will be described in more detail.

First, the function of content access authorization is discussed.

The function of content access authorization is a function defining an authorization process between the application server 200 and the USI server 164. The authorization process between the application server 200 and the USI server 164 is performed as follows.

The application server 200 transmits an authentication request message to the USI server 164. Upon receiving the authentication request message, the USI server 164 performs authentication for the application server 200, and then transmits an authentication response message based on a result of the authentication to the application server 200 as a response to the authentication request message. The authentication request message includes the fields as shown in Table 1 below.

TABLE 1

| Field | Data Type |
|---|---|
| ISPname | String |
| Account | String |
| Password | String |

As described in Table 1, the authentication request message includes an ISPname field, an Account field, and a Password field, and the data type of each field is string. In the message, the ISPname indicates a name of the application server 200 having transmitted the request for authentication to the USI server 164, the Account indicates an account of a subscriber, and the Password indicates a password of the subscriber. Further, the authentication response message includes a field as shown in Table 2 below.

TABLE 2

| Field | Data Type |
| --- | --- |
| resultCode | Integer |

As described in Table 2, the authentication request message includes a resultCode field, the data type of which is integer. The resultCode field indicates a result of the authentication performed by the USI server 164, which is a success or a failure. For example, the resultCode field may have a value of 1 or 2, indicating a success and a failure, respectively.

Second, the function of subscriber location information retrieval is discussed.

The function of subscriber location information retrieval is a function defining a subscriber location information retrieval process between the application server 200 and the USI server 164. The subscriber location information retrieval process between the application server 200 and the USI server 164 is performed as follows.

The application server 200 transmits a location information request message requesting subscriber location information retrieval to the USI server 164. The USI server 164 receives the location information request message from the application server 200, and then retrieves the location information of the subscriber based on the received location information request message. Then, the USI server 164 transmits a location information response message including the retrieved location information of the subscriber to the application server 200 as a response to the location information request message. The location information request message includes the fields as shown in Table 3 below.

TABLE 3

| Field | Data Type |
| --- | --- |
| userIDtype | String |
| UserID | String |
| requestType | String |
| ChargingFlag | Number |

As described in Table 3, the location information request message includes a userIDtype field, a userId field, a requestType field, and a ChargingFlag field. The data type of the userIDtype field, the userID field, and the requestType field is string, and the data type of the ChargingFlag field is number. In the location information request message, the userIDtype field indicates an Internet Protocol (IP) address of the subscriber, the userID field indicates an identifier (ID) of the subscriber, and the requestType field indicates the type of a service, which can be expressed as "Immediate" or "Delay." The "Immediate" refers to an urgent service that has a higher priority than that of the "Delay" service and is processed prior to the "Delay" service. The "Delay" service is processed when there is no request for the "Immediate" service.

The ChargingFlag field is a flag indicating an object of billing. For example, when the ChargingFlag field is set to have a value of 1, it may imply that the object of billing is the application server. For another example, when the ChargingFlag field is set to have a value of 2, it may imply that the object of billing is the subscriber.

Further, the location information response message includes a field as shown in Table 4 below.

TABLE 4

| Field | Data Type |
| --- | --- |
| geographicInfo | String |

As described in Table 4, the location information response message includes a geographicInfo field, the data type of which is string. The geographicInfo field indicates information on an area in which the subscriber is located.

Third, the function of user/device information retrieval is discussed.

The function of user/device information retrieval is a function defining a user/device information retrieval process between the application server 200 and the USI server 164. The user/device information retrieval process between the application server 200 and the USI server 164 is performed as follows.

The application server 200 transmits a device information request message to the USI server 164. The USI server 164 receives the device information request message from the application server 200, and then retrieves device information of a corresponding subscriber. Then, the USI server 164 transmits a device information response message including the retrieved device information to the application server 200 as a response to the device information request message. The device information request message includes the fields as shown in Table 5 below.

TABLE 5

| Field | Data Type |
| --- | --- |
| userIDtype | String |
| UserID | String |
| ChargingFlag | Number |

As described in Table 5, the fields included in the device information request message and the data types of the fields are the same as those in Table 3, so a detailed description thereof will be omitted here.

Further, the device information response message includes the fields as shown in Table 6 below.

TABLE 6

| Field | Data Type |
| --- | --- |
| deviceType | String |
| deviceVendor | String |
| deviceModel | String |
| deviceOSVersion | String |
| deviceTotalMemory | String |
| deviceFreeMemory | String |
| deviceResolution | String |
| MACAddress | String |
| IPAddress | String |
| phoneNumber | String |
| connectivitySupported | String |
| currentConnectivity | String |
| defaultWebBrowserType | String |
| defaultWebBrowserVersion | String |

As described in Table 6, the device information response message includes a deviceType field, a deviceVendor field, a deviceModel field, a deviceOSVersion field, a deviceTotalMemory field, a deviceFreeMemory field, a deviceResolution field, a Medium Access Control (MAC) Address field, an IPAddress field, a phoneNumber field, a connectivitySupported field, a currentConnectivity field, a defaultWebBrowserType field, and a defaultWebBrowserVersion field. The data type of all the fields in the device information response message is string. Hereinafter, the fields of the device information response message will be described in more detail below.

(1) deviceType field

The deviceType indicates the type of an MS, such as PDA, personal computer, PMP, camera, etc.

(2) deviceVendor field

The deviceVendor indicates a vendor of a corresponding MS.

(3) deviceModel field

The deviceModel indicates model information of the corresponding MS.

(4) deviceOSVersion field

The deviceOSVersion indicates version information of an Operating System (OS) used by the corresponding MS.

(5) deviceTotalMemory field

The deviceTotalMemory indicates the total memory size of the corresponding MS.

(6) deviceFreeMemory field

The deviceFreeMemory indicates a memory size that can be currently used by the corresponding MS.

(7) deviceResolution field

The deviceResolution indicates a resolution of the corresponding MS.

(8) MACAddress field

The MACAddress indicates a MAC address of the corresponding MS.

(9) IPAddress field

The IPAddress indicates a current IP address of the corresponding MS.

(10) phoneNumber field

The phoneNumber indicates a phone number of the corresponding MS.

(11) connectivitySupported field

The connectivitySupported indicates a connectivity usable by the corresponding MS. The connectivity may be Bluetooth, 802.11, etc.

(12) currentConnectivity field

The currentConnectivity indicates a connectivity currently usable by the corresponding MS.

(13) defaultWebBrowserType field

The defaultWebBrowserType indicates a basic web browser type of the corresponding MS.

(14) defaultWebBrowserVersion field

The defaultWebBrowserVersion indicates a basic web browser version of the corresponding MS.

Fourth, the function of QoS requirement enforcement is discussed.

The function of QoS requirement enforcement is a function defining a QoS requirement enforcement process between the application server 200 and the USI server 164. The QoS requirement enforcement process between the application server 200 and the USI server 164 is performed as follows.

The application server 200 transmits a QoS policy request message requesting a QoS policy for a corresponding subscriber to the USI server 164. The USI server 164 receives the QoS policy request message from the application server 200, and then retrieves QoS policy for the corresponding subscriber. Then, the USI server 164 transmits a QoS policy response message including the retrieved QoS policy to the application server 200 as a response to QoS policy request message. The QoS policy request message includes the fields as shown in Table 7 below.

TABLE 7

| Field name | Type | Remark |
| --- | --- | --- |
| SessionID | Number | Used for correlation of the Reserved and Terminated operation in same service. |
| UserIDtype | string | IPAddress |
| UserID field | string | |
| requestType | string | Reserved |
| srcIPAddress | string | IP address of IPTV server |
| srcPort | Number | Port of IPTV server |
| destIPAddress | string | IP address of User |
| destPort | Number | Port of User |
| serviceType | string | A: VoIP/VT with silence suppression B: IPTV C: IM D~F: reserved |
| direction | string | 0: Uplink, 1: downlink, 2: both |
| Charging Flag | Number | 1: ISP charging 2: Subscriber Charging |

As described in Table 7, the QoS policy request message includes a SessionID field, a UserIDtype field, a UserID field, a requestType field, an srcIPAddress field, an srcPort field, a destIPAddress field, a destPort field, a serviceType field, a direction field, and a Charging Flag field. From among the fields in Table 6, the data type of the SessionID field, the srcPort field, the destPort field, and the Charging Flag field is number, and the data type of the other fields is string. The SessionID indicates an ID of a corresponding session, and the requestType includes two types, that is, "Reserved" and "Terminated." When the requestType is "Reserved," it implies a message requesting to start a QoS service. When the requestType is "Terminated," it implies a message requesting to terminate the QoS service. Further, in Table 7, the srcIPAddress indicates an IP address of the application server providing the service, the srcPort indicates a port of the application server 200 providing the service, the destIPAddress indicates an IP address of a corresponding subscriber, the destPort indicates a port of the corresponding subscriber, the serviceType indicates the type of the provided service (such as VoD service, IPTV service, etc.), and the direction indicates a QoS support direction (for example, uplink only, downlink only, both, etc.).

Further, the QoS policy response message includes a field as shown in Table 8 below.

TABLE 8

| Field | Data Type |
| --- | --- |
| ResultCode | Integer |

As described in Table 8, the authentication request message includes a resultCode field, the data type of which is integer. The resultCode field indicates whether it is possible to provide a QoS policy for the QoS policy request message, by using information indicating a success or a failure. For example, the resultCode field may have a value of 1 or 2, indicating a success and a failure, respectively.

Fifth, the function of server triggered paging transaction is discussed.

The function of Server triggered paging transaction is a function defining a server triggered paging transaction process between the application server 200 and the USI server 164. The server triggered paging transaction process between the application server 200 and the USI server 164 is performed as follows.

The application server 200 transmits a service alert request message requesting paging to a corresponding subscriber to the USI server 164. The USI server 164 receives the service alert request message from the application server 200, and then determines if it is possible to page the corresponding subscriber. Then, the USI server 164 transmits a service alert response message including a result of the determination for the possibility of the paging to the application server 200 as a response to the service alert request message. The service alert request message includes fields as shown in Table 9 below.

TABLE 9

| Field | Data Type |
| --- | --- |
| userIDtype | String |
| UserID | String |
| calleeIDType | String |
| calleeID | String |
| applicationType | String |
| ChargingFlag | Number |

As described in Table 9, the service alert request message includes a userIDtype field, a userID field, a calleeIDType field, a calleeID field, an applicationType field, and a ChargingFlag field. The data type of the userIDtype field, the userID field, the calleeIDType field, the calleeID field, and the applicationType field is string, and the data type of the ChargingFlag field is number. The userIDtype indicates an IP address of a subscriber requesting the paging, the userID indicates an ID of the subscriber requesting the paging, the calleeIDType indicates an IP address of a subscriber receiving the paging, the calleeID indicates an ID of the subscriber receiving the paging, and the applicationType indicates the type of a used messenger.

Further, the service alert response message includes a field as shown in Table 10 below.

TABLE 10

| Field | Data Type |
| --- | --- |
| ResultCode | Integer |

As described in Table 10, the service alert response message includes a resultCode field, the data type of which is integer. The resultCode field indicates whether it is possible to provide paging for the service alert request message, by using information indicating a success or a failure. For example, the resultCode field may have a value of 1 or 2, indicating a success and a failure, respectively.

(3) U2 Interface (U2 I/F)

The U2 I/F is an interface between the USI server 164 and the ASN GW 162, which employs an HTTP/XML protocol, a Transmission Control Protocol (TCP)/User Datagram Protocol (UDP), or a Remote Authentication Dial-In User Services (DIAMETER/RADIUS) protocol. Further, the U2 I/F has the following functions.

<Functions>
Subscriber location information request/response
Paging feature triggering
Requested QoS enforcement request/response
Guaranteed QoS matrix report
Presence information request/response
Provisioning (4) U3 Interface (U3 I/F)

The U3 I/F is an interface between the USI server 164 and the CSN 163, which employs an HTTP/XML protocol or a DIAMETER/RADIUS protocol. Further, the U3 I/F has the following functions.

<Functions>
Internet Protocol (IP) layer information transaction
IP level Paging feature triggering
Requested QoS enforcement request/response
Content inspection triggering
Content aggregation/addition triggering (5) Billing Interface The billing interface is an interface between the USI server 164 and the billing server 169, which employs an HTTP/XML protocol or a DIAMETER/RADIUS protocol. Further, the billing interface has the following functions.

<Functions>
Pre/Post-pay accounting transaction
Accounting record transaction (6) User_Profile Interface The User_Profile Interface is an interface between the USI server 164 and the user profile server 167, which employs an HTTP/XML protocol or a DIAMETER/RADIUS protocol. The User_Profile Interface has the following functions.

<Functions>
Service authentication/authorization request/response
Service profile request/response
Subscriber profile request/response (7) Device_Capability Interface The Device_Capability Interface is an interface between the USI server 164 and the device capability server 166, which employs an HTTP/XML protocol or a DIAMETER/RADIUS protocol. The Device_Capability Interface has the following function.

<Function>
Device profile request/response (8) Location_Information Interface

The Location_Information Interface is an interface between the USI server 164 and the location information server 165, which employs a TCP/UDP protocol. The Location_Information Interface has the following function.

<Function>
User or Device location information request/response (9) QoS Interface The QoS Interface is an interface between the USI server 164 and the QoS server 168, which employs an HTTP/XML protocol or a DIAMETER/RADIUS protocol. The QoS Interface has the following functions.

<Functions>
User/Device/Service QoS information request/response
QoS decision functionality Hereinafter, a process of retrieving location information of an MS 170 according to a request of the application server 200 in the communication network of FIG. 2 will be described with reference to FIG. 3.

Figure 3:
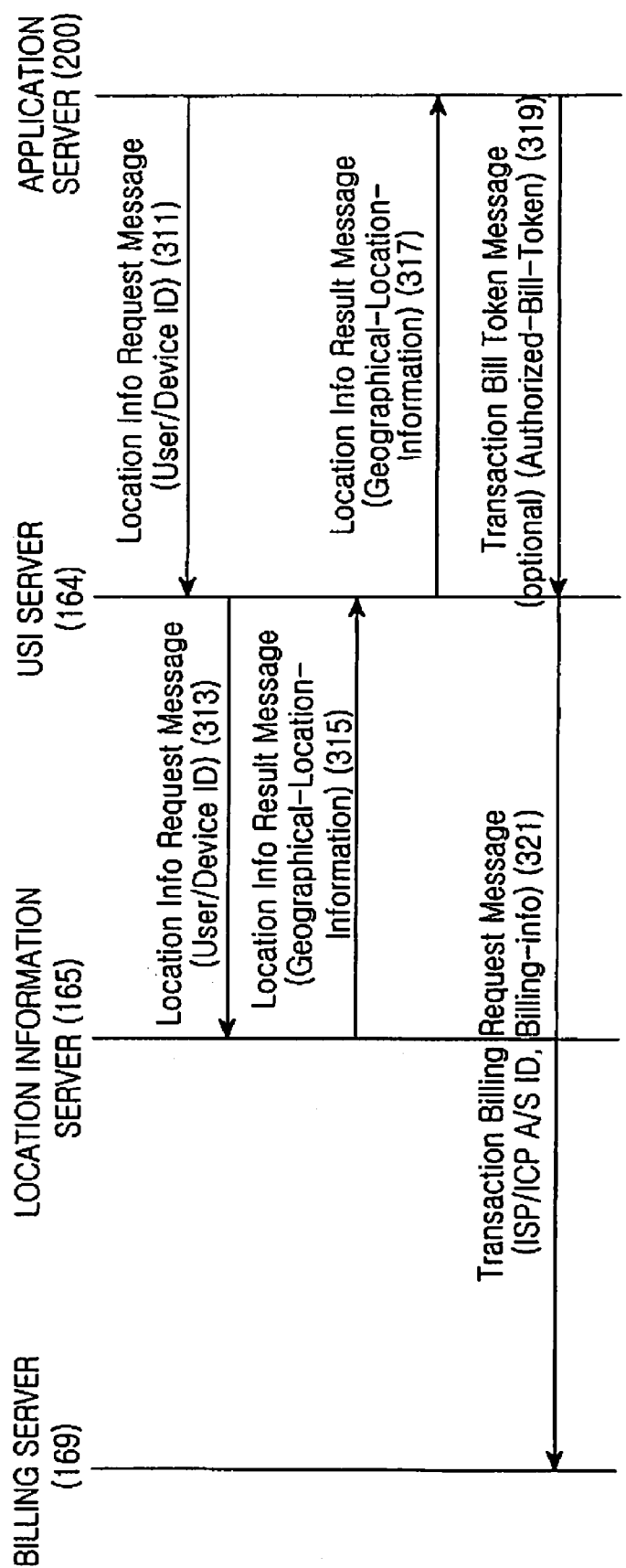
FIG. 3 is a signal flow diagram illustrating a process of retrieving location information of the MS 170 according to a request of the application server 200 in the communication network of FIG. 2 according to the present invention.

FIG. 3 is a signal flow diagram illustrating a process of retrieving location information of the MS 170 according to a request of the application server 200 in the communication network of FIG. 2.

In FIG. 3, the application server 200 transmits a location information request message (location info request message) including an ID of an MS, location information of which is required to be retrieved, to the USI server 164 in step 311. The ID of the MS included in the location info request message may be a user ID or a device ID. Upon receiving the location info request message from the application server 200, the USI server 164 transmits the location info request message to the location information server 165 in step 313.

Upon receiving the location info request message from the USI server 164, the location information server 165 retrieves the location information of the MS corresponding to the ID of the MS included in the location info request message. Further, the location information server 165 transmits a location info result message including the retrieved geographical location information of the MS to the USI server 164 in step 315. Then, the USI server 164 transmits the location info result message received from the location information server 165 as it is to the application server 200 in step 317.

Since the location information of the MS has been retrieved according to the request from the application server 200 as described above, the application server 200 should pay the charge for the retrieval of the location information to the mobile communication system 160. Therefore, the application server 200 transmits a transaction bill token message including payment information (hereinafter, authorized-bill-token message) for the location information retrieved according to authorization by the application server 200 itself to the USI server 164 in step 319. The transaction refers to an event to be processed, and the process of transmitting the transaction bill token may be optionally performed since the billing server 169 may be storing the billing information at the very time the location information server 165 transmits the location info result message to the USI server 164.

Upon receiving the transaction bill token message, the USI server 164 transmits a transaction billing request message to the billing server 169. The transaction billing request message includes the billing information and an Internet Content Provider (ICP) application server ID or an Internet Service Provider (ISP) application server ID of the application server 200 having retrieved the location information of the MS. Further, the billing server 169 stores the billing information in step 321. Although the present embodiment deals with a case where billing is based on the ID of the application server 200, it is of course possible to perform the billing based on the ID (i.e. the ISP/ICP ID) of the mobile communication system 160 itself instead of the ID of the application server 200, because the mobile communication system 160 may collectively control the billing to all the application servers within the mobile communication system 160.

Hereinafter, a process of tracking the location of an MS according to a request of the application server 200 in the communication network of FIG. 2 is described with reference to FIG. 4.

Figure 4:
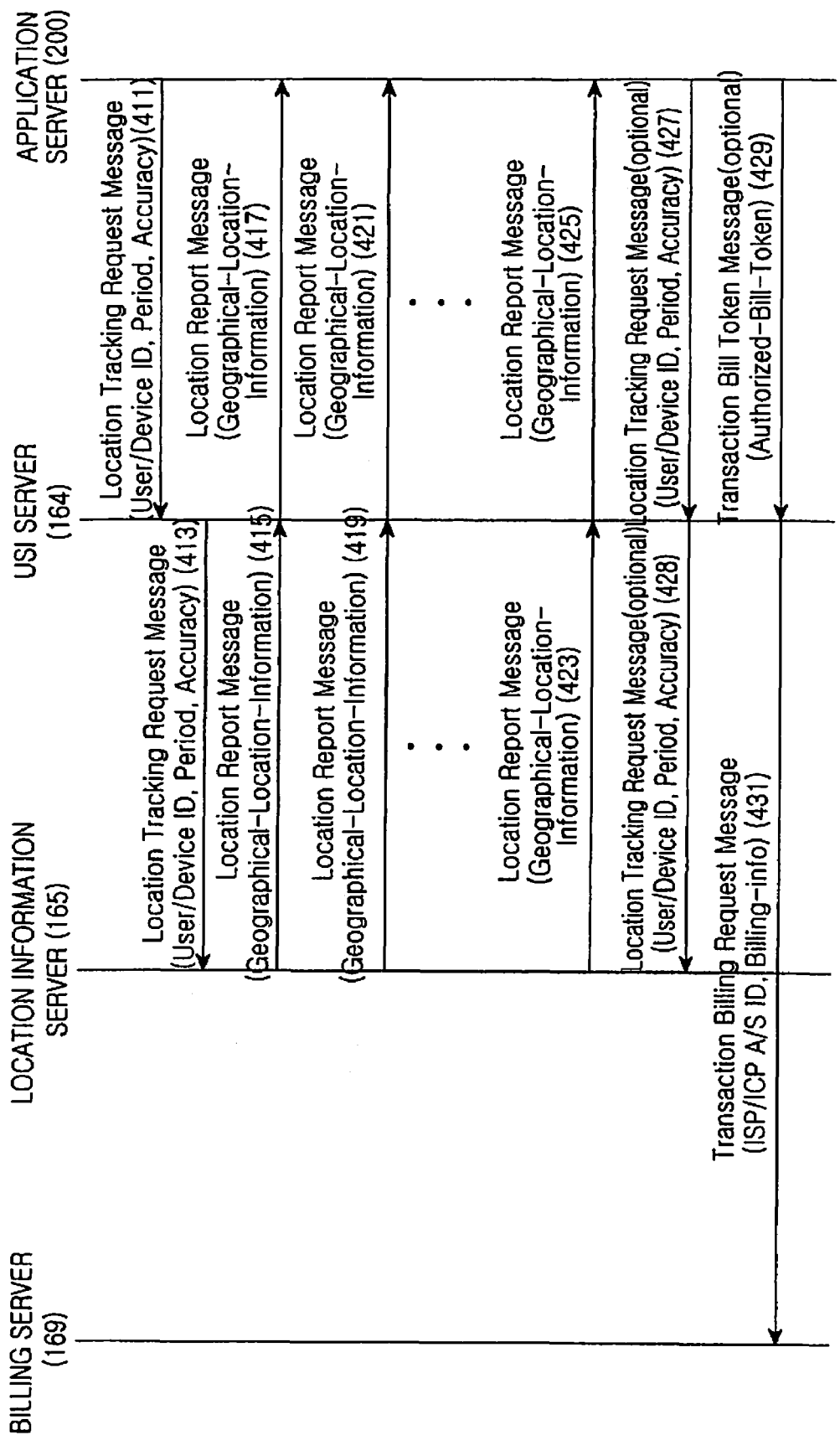
FIG. 4 is a signal flow diagram illustrating a process of tracking the location of an MS according to a request of the application server 200 in the communication network of FIG. 2 according to the present invention.

FIG. 4 is a signal flow diagram illustrating a process of tracking the location of an MS according to a request of the application server 200 in the communication network of FIG. 2.

In FIG. 4, the application server 200 transmits a location tracking request message including an ID of an MS, location of which is required to be tracked, to the USI server 164 in step 411. The ID of the MS included in the location tracking request message may be a user ID or a device ID. Further, the location tracking request message includes not only the ID of the MS but also information on the period for location tracking and accuracy of the required location tracking. Upon receiving the location tracking request message, the USI server 164 transmits the received location tracking request message as it is to the location information server 165 in step 413.

Upon receiving the location tracking request message, the location information server 165 retrieves the location information of the MS corresponding to the ID of the MS included in the location tracking request message. Then, location information server 165 transmits a location report message including the retrieved geographical location information of the MS to the USI server 164 in step 415. The USI server 164 transmits the received location report message as it is to the application server 200 in step 417. Further, the location information server 165 transmits the location report message containing the location information of the MS retrieved during a period corresponding to the period information included in the location tracking request message to the USI sever 164, and the USI server 164 transmits the received location report message to the application server 200 in steps 419, 421, 423, and 425. Of course, when the location tracking is to be terminated even before the period corresponding to the period information entirely passes, the application server 200 transmits the location tracking request message to the USI server 164 with the period information set to "0" in step 427. At this time also, the USI server 164 transmits the location tracking request message with the period information set to "0," which has been received from the application server 200, to the location information server 165 in step 428.

Since the location of the MS has been tracked according to the request from the application server 200 as described above, the application server 200 should pay the charge for the location tracking to the mobile communication system 160. Therefore, the application server 200 transmits a transaction bill token message including an authorized-bill-token for the location information tracked according to authorization by the application server 200 itself to the USI server 164 in step 429. The process of transmitting the transaction bill token message is also optionally performed. This is because the billing server 169 may be storing the billing information at the very time the location information server 165 transmits the location report message to the USI server 164.

Upon receiving the transaction bill token message, the USI server 164 transmits a transaction billing request message to the billing server 169. The transaction billing request message includes the billing information and an ICP/ISP application server ID of the application server 200 having tracked the location of the MS. Further, the billing server 169 stores the billing information in step 431.

Hereinafter, a process of retrieving a device capability of an MS according to a request of the application server 200 in the communication network of FIG. 2 is described below with reference to FIG. 5.

Figure 5:
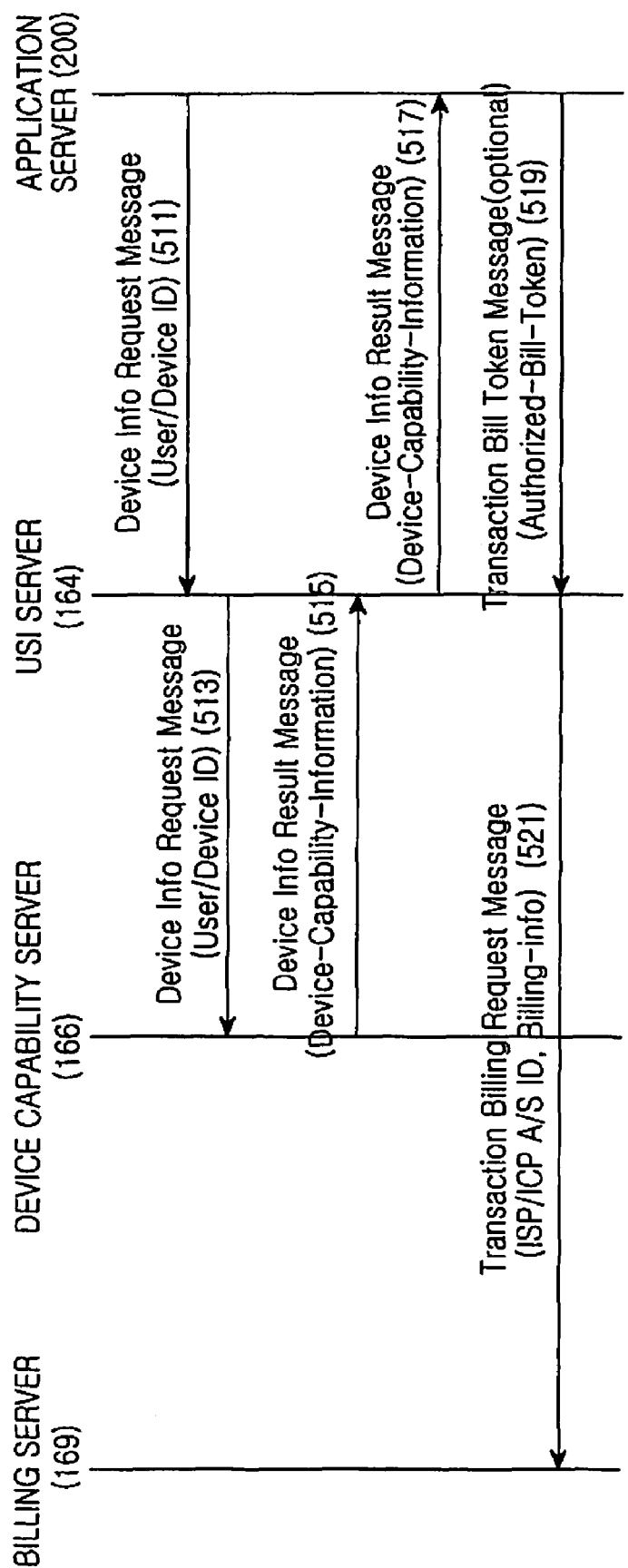
FIG. 5 is a signal flow diagram illustrating a process of retrieving a device capability of an MS according to a request of the application server 200 in the communication network of FIG. 2 according to the present invention.

FIG. 5 is a signal flow diagram illustrating a process of retrieving a device capability of an MS according to a request of the application server 200 in the communication network of FIG. 2.

In FIG. 5, the application server 200 transmits a device information (info) request message including an ID of an MS, a device capability of which is required to be retrieved, to the USI server 164 in step 511. The ID of the MS included in the device info request message may be a user ID or a device ID. Upon receiving the device info request message from the application server 200, the USI server 164 transmits the received device info request message as it is to the device capability server 166 in step 513.

Upon receiving the device info request message from the USI server 164, the device capability server 166 retrieves the device capability of the MS corresponding to the ID of the MS included in the device info request message. Then, the device capability server 166 transmits a device info result message including the retrieved device capability information (device-capability-information) of the MS to the USI server 164 in step 515. The USI server 164 transmits the received device info result message as it is to the application server 200 in step 517.

Since the device capability of the MS has been tracked according to the request from the application server 200 as described above, the application server 200 should pay the charge for the retrieval of the device capability to the mobile communication system 160. Therefore, the application server 200 transmits a transaction bill token message including an authorized-bill-token for the device capability retrieved according to authorization by the application server 200 itself to the USI server 164 in step 519. The process of transmitting the transaction bill token message is also optionally performed. This is because the billing server 169 may be storing the billing information at the very time the device capability server 166 transmits the device info result message to the USI server 164.

Upon receiving the transaction bill token message, the USI server 164 transmits a transaction billing request message to the billing server 169. The transaction billing request message includes the billing information and an ICP/ISP application server ID of the application server 200 having retrieved the device capability of the MS. Further, the billing server 169 stores the billing information in step 521.

Hereinafter, a process of retrieving a user profile of an MS according to a request of the application server 200 in the communication network of FIG. 2 is described below with reference to FIG. 6.

Figure 6:
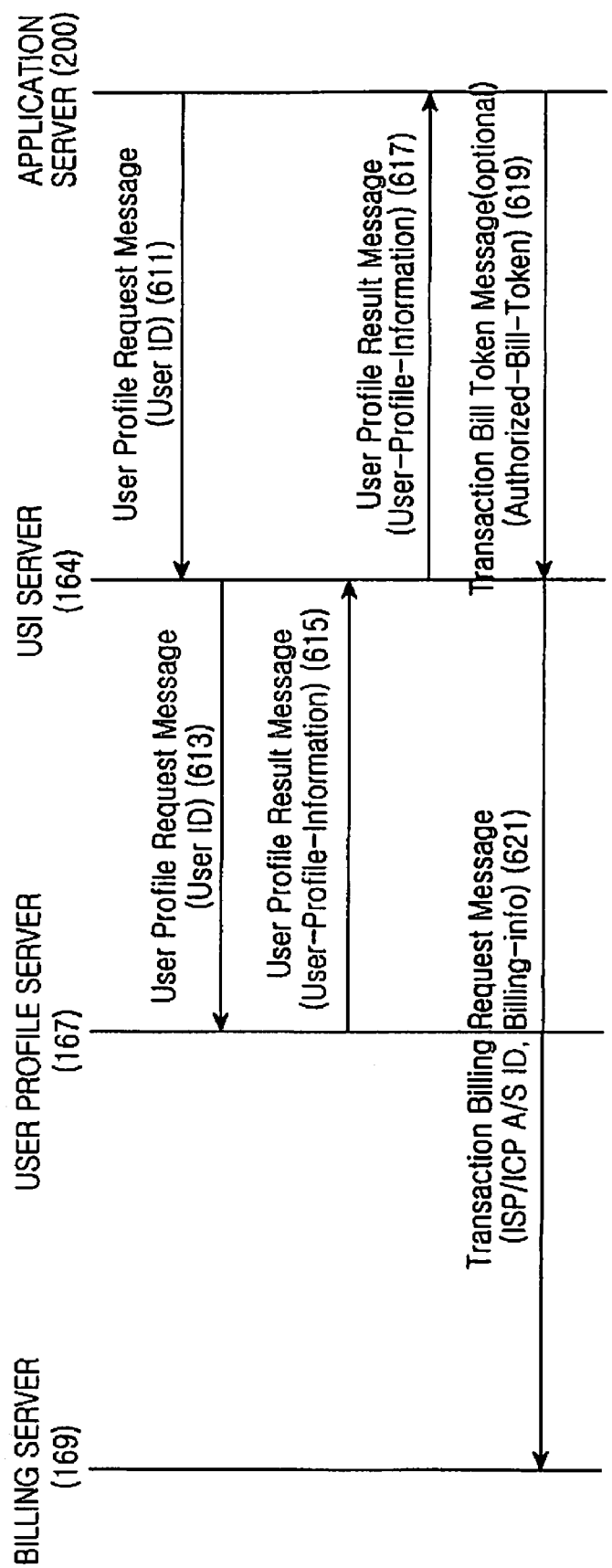
FIG. 6 is a signal flow diagram illustrating a process of retrieving a user profile of an MS according to a request of the application server 200 in the communication network of FIG. 2 according to the present invention.

FIG. 6 is a signal flow diagram illustrating a process of retrieving a user profile of an MS according to a request of the application server 200 in the communication network of FIG. 2.

In FIG. 6, the application server 200 transmits a user profile request message including an ID of an MS, a user profile of which is required to be retrieved, to the USI server 164 in step 611. The ID of the MS included in the user profile request message may be a user ID. Upon receiving the user profile request message from the application server 200, the USI server 164 transmits the received user profile request message as it is to the user profile server 167 in step 613.

Upon receiving the user profile request message from the USI server 164, the user profile server 167 retrieves the user profile of the MS corresponding to the ID of the MS included in the user profile request message. Then, the user profile server 167 transmits a user profile result message including the retrieved user profile information (user-profile-information) of the MS to the USI server 164 in step 615. The USI server 164 transmits the received user profile result message as it is to the application server 200 in step 617.

Since the user profile of the MS has been retrieved according to the request from the application server 200 as described above, the application server 200 should pay the charge for the retrieval of the user profile to the mobile communication system 160. Therefore, the application server 200 transmits a transaction bill token message including an authorized-bill-token for the user profile retrieved according to authorization by the application server 200 itself to the USI server 164 in step 619. The process of transmitting the transaction bill token message is also optionally performed. This is because the billing server 169 may be storing the billing information at the very time the user profile server 167 transmits the user profile result message to the USI server 164.

Upon receiving the transaction bill token message, the USI server 164 transmits a transaction billing request message to the billing server 169. The transaction billing request message includes the billing information and an ICP/ISP application server ID of the application server 200 having retrieved the user profile of the MS. Further, the billing server 169 stores the billing information in step 621.

Hereinafter, a process of paging an MS according to a request of the application server 200 in the communication network of FIG. 2 is described with reference to FIG. 7.

Figure 7:
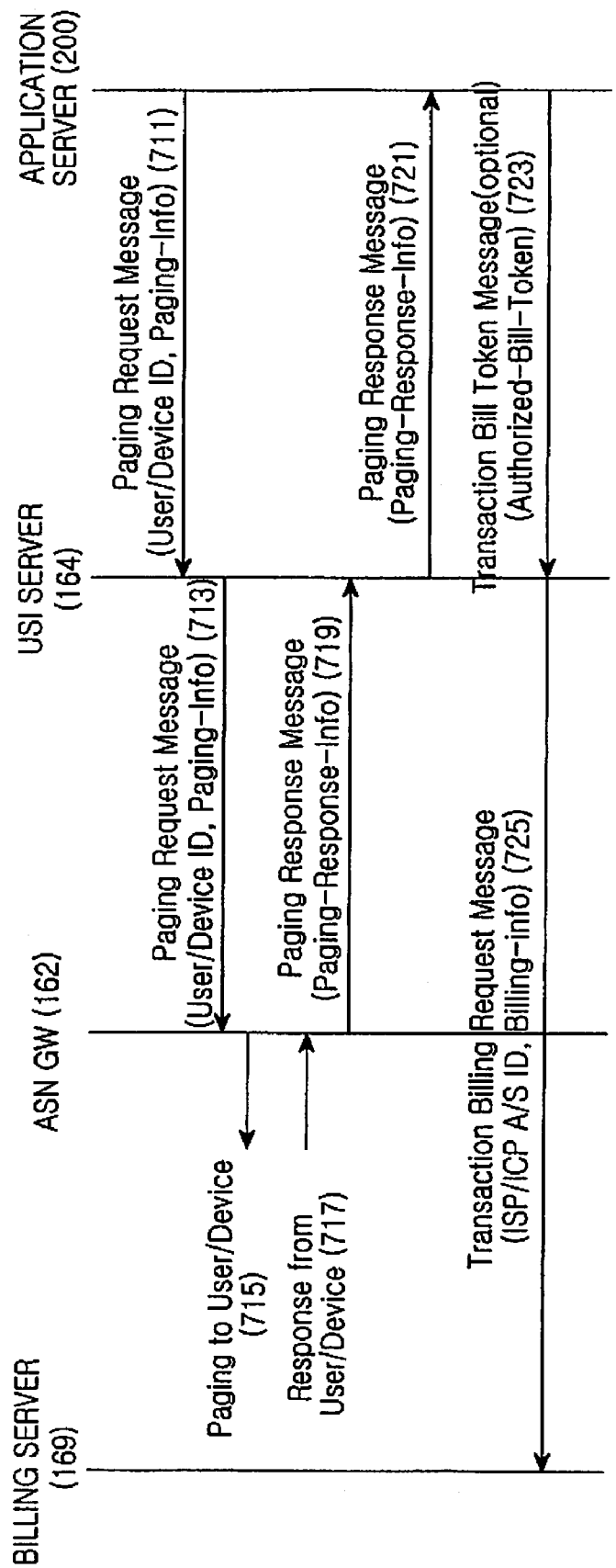
FIG. 7 is a signal flow diagram illustrating a process of paging an MS according to a request of the application server 200 in the communication network of FIG. 2 according to the present invention.

FIG. 7 is a signal flow diagram illustrating a process of paging an MS according to a request of the application server 200 in the communication network of FIG. 2.

In FIG. 7, the application server 200 transmits a paging request message including an ID of an MS to be paged to the USI server 164 in step 711. The ID of the MS included in the paging request message may be a user ID or a device ID, and the paging request message includes paging information in relation to the MS. Upon receiving the paging request message from the application server 200, the USI server 164 transmits the received paging request message as it is to the ASN GW 162 in step 713.

Upon receiving the paging request message from the USI server 164, the ASN GW 162 performs paging of an MS corresponding to the ID of the MS included in the paging request message (i.e., paging to User/Device & Response from User/Device as in steps 715 and 717. Then, the ASN GW 162 transmits a paging response message including paging response information (paging-response-info) to the USI server 164 in step 719. The USI server 164 transmits the received paging response message as it is to the application server 200 in step 721.

Since the paging of the MS has been performed according to the request from the application server 200 as described above, the application server 200 should pay the charge for the paging request to the mobile communication system 160. Therefore, the application server 200 transmits a transaction bill token message including an authorized-bill-token for the paging requested according to authorization by the application server 200 itself to the USI server 164 in step 723. The process of transmitting the transaction bill token message is also optionally performed, because the billing server 169 may be storing the billing information at the very time the ASN GW 162 transmits the paging response message to the USI server 164.

Upon receiving the transaction bill token message, the USI server 164 transmits a transaction billing request message to the billing server 169. The transaction billing request message includes the billing information and an ICP/ISP application server ID of the application server 200 having requested the paging of the MS. Further, the billing server 169 stores the billing information in step 725.

Hereinafter, a process of providing a QoS based Internet service according to a request of the application server 200 in the communication network of FIG. 2 is described below with reference to FIG. 8.

Figure 8:
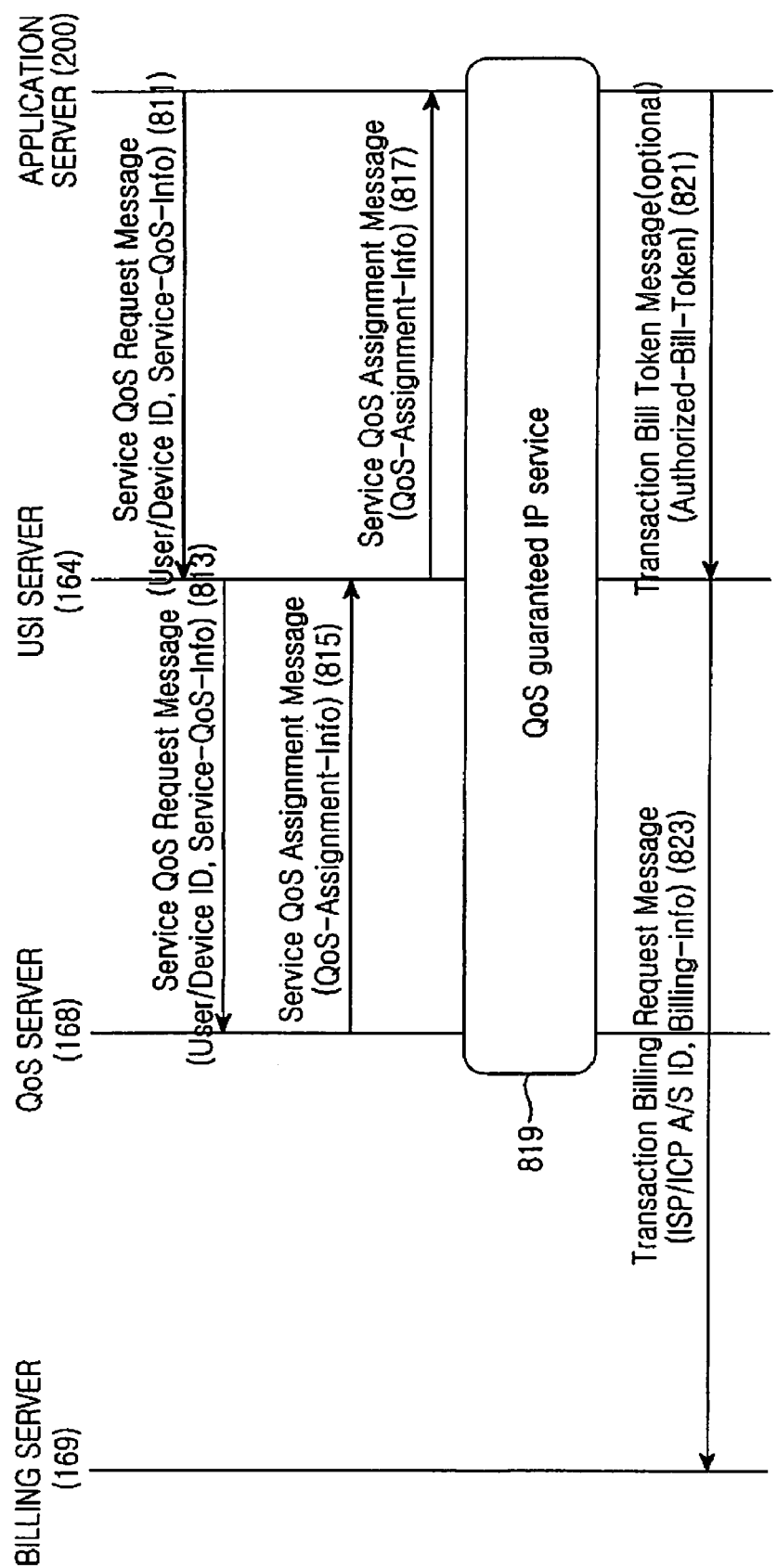
FIG. 8 is a signal flow diagram illustrating a process of providing a QoS based Internet service according to a request of the application server 200 in the communication network of FIG. 2 according to the present invention.

FIG. 8 is a signal flow diagram illustrating a process of providing a QoS based Internet service according to a request of the application server 200 in the communication network of FIG. 2.

In FIG. 8, the application server 200 transmits a service QoS request message including an ID of an MS requesting provision of a QoS based Internet service to the USI server 164 in step 811. The ID of the MS included in the service QoS request message may be a user ID or a device ID, and the service QoS request message includes information (Service-QoS-Info) on a QoS level to be guaranteed for a corresponding MS in an Internet service. Upon receiving the service QoS request message from the application server 200, the USI server 164 transmits the received service QoS request message as it is to the QOS server 168 in step 813.

Upon receiving the service QoS request message from the USI server 164, the QOS server 168 determines QoS assignment information (QoS-assignment-info) necessary for provision of an Internet service at a QoS level required by a corresponding MS, by referring to the information on the required QoS level and an MS ID included in the service QoS request message. The QoS-assignment-info includes TCP/UDP port information, allocated QoS level information, etc. Then, the QOS server 168 transmits a service QoS assignment message including the determined QoS-assignment-info to the USI server 164 in step 815. The USI server 164 transmits the received service QoS assignment message as it is to the application server 200 in step 817.

Upon receiving the service QoS assignment message, the application server 200 provides an Internet service to the corresponding MS while guaranteeing the QoS required by the MS, based on the QoS-assignment-info included in the service QoS assignment message (i.e., QoS guaranteed IP service as in step 819).

Since a QoS based Internet service has been provided to the MS according to the request from the application server 200 as described above, the application server 200 should pay the charge for the QoS based Internet service to the mobile communication system 160. Therefore, the application server 200 transmits a transaction bill token message including an authorized-bill-token for the QoS based Internet service provided according to authorization by the application server 200 itself to the USI server 164 in step 821. The process of transmitting the transaction bill token message is also optionally performed, because the billing server 169 may be storing the billing information at the very time the QOS server 168 transmits the service QoS assignment message to the USI server 164.

Upon receiving the transaction bill token message, the USI server 164 transmits a transaction billing request message to the billing server 169. The transaction billing request message includes the billing information and an ICP/ISP application server ID of the application server 200 having requested provision of the QoS based Internet service to the MS. Further, the billing server 169 stores the billing information in step 823.

Hereinafter, an internal structure of the USI server 164 is described with reference to FIG. 9.

Figure 9:
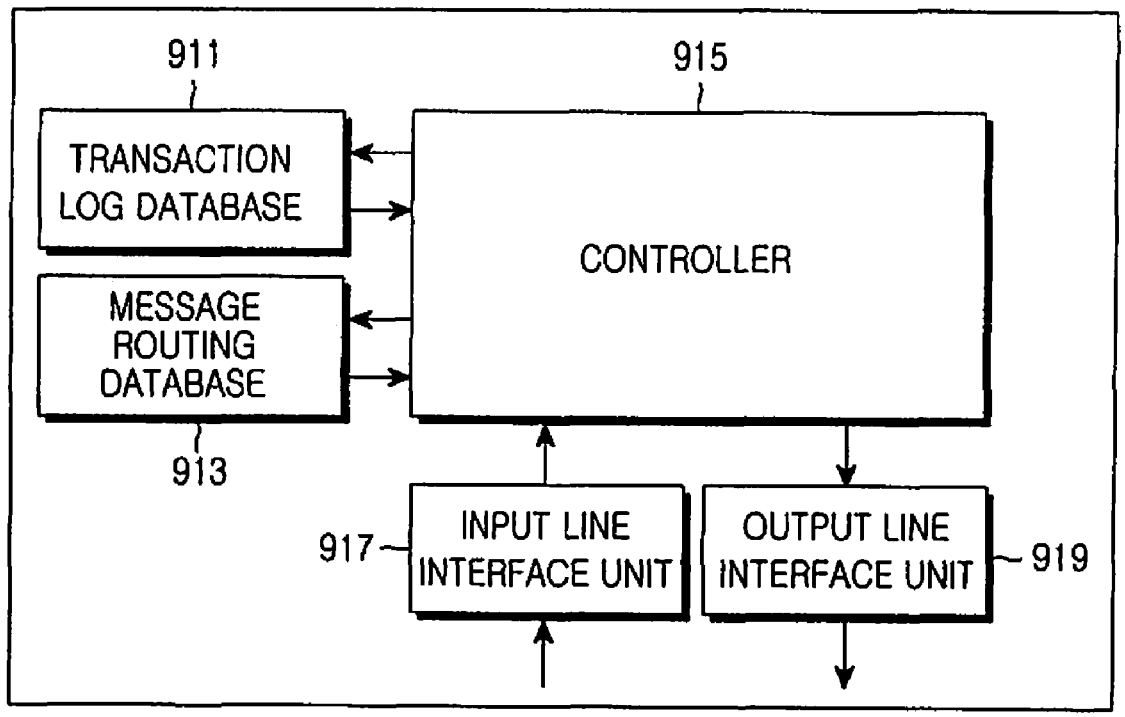
FIG. 9 is a block diagram illustrating an internal structure of the USI server 164 according to the present invention.

FIG. 9 is a block diagram illustrating an internal structure of the USI server 164.

In FIG. 9, the USI server 164 includes a transaction log database 911, a message routing database 913, a controller 915, an input line interface unit 917, and an output line interface unit 919.

The input line interface unit 917 and the output line interface unit 919 provide interfaces between the application server 200 and the mobile communication system 160. Further, when a particular event is received from the application server 200, the message routing database 913 becomes necessary in order to transmit the received event to a corresponding server within the mobile communication system 160. An internal structure of the message routing database 913 is described later in more detail.

Further, the transaction log database 911 is required in order to transmit a response received from an internal server of the mobile communication system in accordance with the event from the application server 200. An internal structure of the transaction log database 911 will be described later in more detail.

Hereinafter, the internal information structure of the message routing database 913 is described below with reference to FIG. 10.

FIG. 10 illustrates an internal information structure of the message routing database 913 of FIG. 9.

Presumably, when the USI server 164 receives a particular event from the application server 200, the message routing database 913 becomes necessary in order to transmit the received event to a corresponding server within the mobile communication system 160. That is, when the USI server 164 receives a particular event from the application server 200, the USI server 164 analyzes the particular event and determines an internal server within the mobile communication system 160, to which the particular event should be delivered, based on the analyzed event. Then, the USI server 164 delivers the particular event to the determined internal server. In delivering the particular event to the determined internal server, the USI server 164 refers to the message routing database 913.

In FIG. 10, the message routing database 913 includes a "Server Name area," a "Serviced User/Device Range area," and an "Other Information area."

The "Server Name area" corresponds to an area indicating a name of the internal server within the mobile communication system 160 and may indicate an address of the internal server instead of the server name. Meanwhile, when a particular server within the mobile communication system 160 is unable to perform all necessary functions, the particular server may be realized by multiple units. When the particular server is realized by a single unit, a value of the "Serviced User/Device Range area" is recorded as "ALL." When the particular server is realized by multiple units, the value of the "Serviced User/Device Range area" is recorded as "ODD" or "EVEN." Further, additional information necessary for each corresponding internal server is recorded in the "Other Information area."

Hereinafter, the internal information structure of the transaction log database 911 is described with reference to FIG. 11.

FIG. 11 illustrates an internal information structure of the transaction log database 911 of FIG. 9.

Presumably, the transaction log database 911 becomes necessary in order to transmit a response, which has been received from an internal server within the mobile communication system 160 with respect to an event from the application server 200, to the application server 200. That is, when the USI server 164 receives a particular event from the application server 200 and then transmits the particular event to an internal server within the mobile communication system 160, the internal server transmits a response to the received particular event to the USI server 164. Then, before the received response from the internal server is transmitted to the application server 200, information on the particular event is stored in the transaction log database 911.

In FIG. 11, the transaction log database 911 includes a "Transaction Code area," an "ISP/ICP A/S Name area," a "Server Name area," and an "Other Information area." A transaction code mapped to each particular event received from the application server 200 is recorded in the "Transaction Code area." The transaction code is provided whenever an event occurs, and is maintained until a response to the event is transmitted to the application server 200. Further, the transaction code either may be clearly recorded in all messages transmitted between corresponding internal servers within the mobile communication system 160, the USI server 164, and the application server 200, or may be managed by only the USI server 164. A name of an ISP/ICP application server having transmitting the particular event is recorded in the "ISP/ICP A/S Name area." Of course, instead of the name of an ISP/ICP application server, an IP address may be recorded in the "ISP/ICP A/S Name area." Further, a name of an internal server processing an event corresponding to the transaction code is recorded in the "Server Name area." Of course, instead of the name of the internal server, an IP address may be recorded in the "Server Name area." Further, additional information necessary for each corresponding transaction is recorded in the "Other Information area."

Hereinafter, an operation of the USI server 164 is described with reference to FIG. 12.

Figure 12:
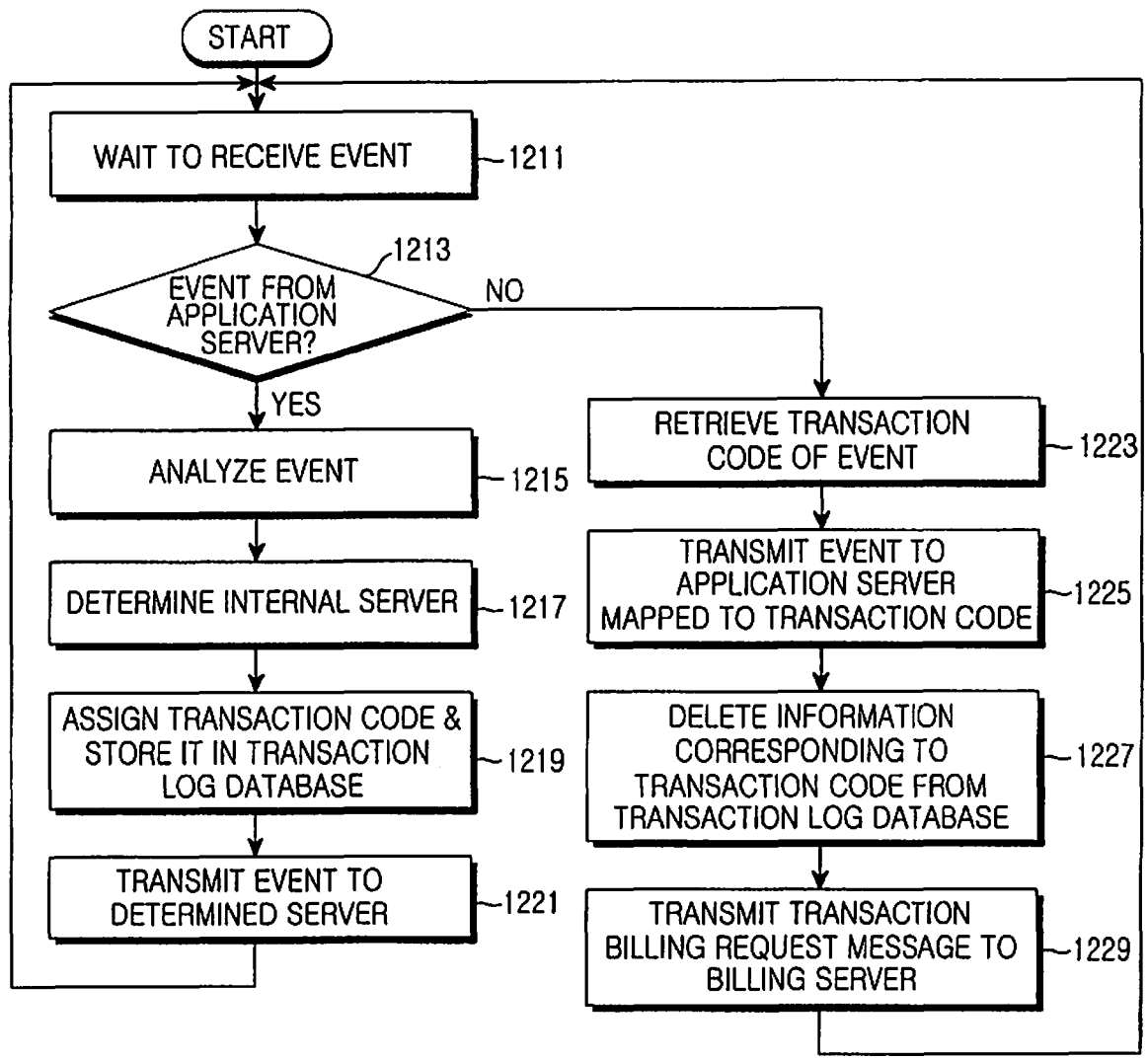
FIG. 12 is a flowchart illustrating a process of the USI server 164 of FIG. 2 according to the present invention.

FIG. 12 is a flow diagram illustrating a process of the USI server 164 of FIG. 2.

In FIG. 12, the USI server 164 is waiting to receive an event in step 1211. Then, in step 1213, when the USI server 164 receives an event, the USI server 164 determines if the event has been transmitted from the application server 200. As a result of the determination, when the received event has been transmitted from the application server 200, the USI server 164 proceeds to step 1215. In step 1215, the USI sever 164 analyzes the event. Then, in step 1217, the USI server 164 determines an internal server of the mobile communication system 160, to which the received event will be transmitted, based on a result of the analysis of the event. The internal server, to which the received event will be transmitted, is determined by referring to the message routing database 913.

In step 1219, the USI server 164 allocates a transaction code to the received event, maps the received event to the allocated transaction code, and then stores the mapped data in the transaction log database 911. Then, in step 1221, the USI server 164 transmits the received event to the determined internal server and then returns to step 1211.

As a result of the determination in step 1213, when the received event has not been transmitted from the application server 200, that is, when the received event has been transmitted from an internal server of the mobile communication system 160, the USI server 164 proceeds to step 1223. In step 1223, the USI server 164 detects a transaction code of the received event, since the event has been transmitted from the internal server. In step 1225, the USI server 164 transmits the received event to the application server 200 mapped to the detected transaction code by referring to the transaction log database 911.

Then, in step 1227, the USI server 164 deletes the information corresponding to the transaction code from the transaction log database 911. Then, in step 1229, the USI server 164 transmits a transaction billing request message to the billing server 169 for billing to the application server 200 according to complete processing of the event, and then returns to step 1211.

Hereinafter, a format of a message transmitted/received in the communication network of FIG. 2 is described with reference to FIGS. 13A and 13B.

Figure 13A:
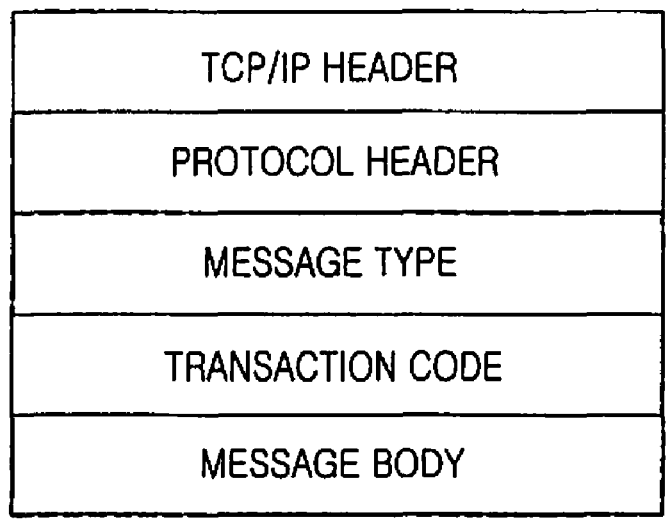
FIGS. 13A and 13B briefly illustrate a format of a message transmitted/received in the communication network of FIG. 2 according to the present invention.
Figure 13B:
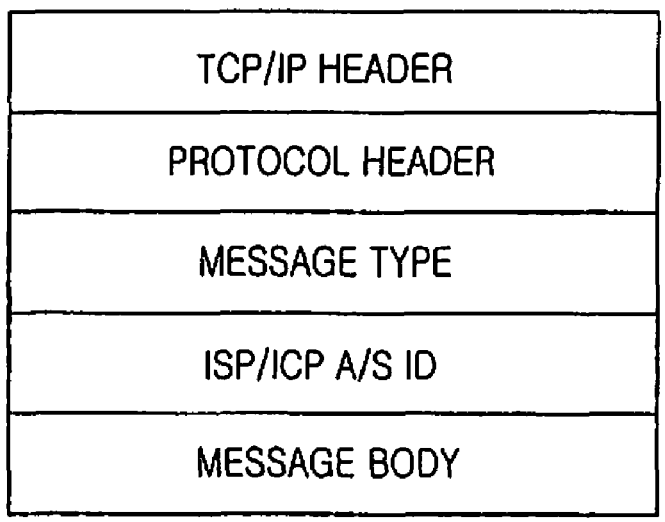

FIGS. 13A and 13B briefly illustrate a format of a message transmitted/received in the communication network of FIG. 2.

The message format shown in FIG. 13A corresponds to a message format when a transaction code is clearly recorded in the message, and the message format shown in FIG. 13B corresponds to a message format when a transaction code is not clearly recorded in the message. When a transaction code is not clearly recorded in the message, an ISP/ICP A/S ID may be recorded instead of the transaction code.

In FIGS. 13A and 13B, the "message type" area corresponds to an area indicating the type of a corresponding message, and may indicate, for example, as follows according to the message:

<Message Type>

(1) Transaction-Bill-Token: 0x0001
(2) Transaction-Billing-Request: 0x0002
(3) Location-Info-Request: 0x0101
(4) Location-Info-Result: 0x0102
(5) Location-Tracking-Request: 0x0103
(6) Location-Report: 0x0104
(7) Device-Info-Request: 0x0201
(8) Device-Info-Result: 0x0202
(9) User-Profile-Request: 0x0301
(10) User-Profile-Result: 0x0302
(11) Paging-Request: 0x0401
(12) Paging-Response: 0x0402
(13) Service-QoS-Support: 0x0501
(14) Service-QoS-Assignment: 0x0502

Further, the "message body" area may contain different information according to the type of a corresponding message, and may indicate, for example, as follows according to the message:

<Message Body>

(1) Transaction-Bill-Token
Authorized Bill Token; [reliable information issued by the ISP/ICP A/S]
(2) Transaction-Billing-Request
ISP/ICP A/S ID; [ISP/ICP A/S ID that will require the cost]
Billing-Information; [transaction information that will require the cost]
(3) Location-Info-Request
User/Device ID; [targeted user or device ID]
Accuracy; [required accuracy of the location information]
(4) Location-Info-Result
Geo-Location-Information; [location information of the targeted user or device]
(5) Location-Tracking-Request
User/Device ID; [targeted user or device ID]
Period; [required time period for providing the location information]
Interval; [required time interval for providing the location information]
Accuracy; [required accuracy of the location information]
(6) Location-Report
Geo-Location-Information; [location information of the targeted user or device]
(7) Device-Info-Request
User/Device ID; [targeted user or device ID]
(8) Device-Info-Result
Device Type; [type of the targeted device (example: PC, PDA, PMP, . . . )]
O/S Type; [O/S type of the targeted device (example: Windows, Mac, . . . )]
Display Resolution; [display Resolution of the targeted device]
Web Browser Type; [supported web browser type/version of the targeted device]
IP Info [IP information of the targeted device]
Other; [other additional information]
(9)User-Profile-Request
User/Device ID; [targeted user or device ID]
(10) User-Profile-Result
Sex; [sex of the targeted user]
Home Address; [home address of the targeted user]
Office Address; [office address of the targeted user]
Habit; [habit of the targeted user]
Average Charging Rate; [average charging rate of the targeted user]
Preferred Services; [preferred services of the targeted user]
Other; [other additional information]
(11) Paging-Request
User/Device ID; [targeted user or device ID]
Paging-Information; [additional information to be transmitted to the targeted user]
(12) Paging-Response
Paging-Response; [response from the targeted user/device]
(13) Service-QoS-Support
User/Device ID; [targeted user or device ID]
Service QoS Information; [QoS request info for the service]
(14) Service-QoS-Assignment -continued <Message Body>

QoS Assignment Information; [QoS info allocated to the service]
[   example: allocated TCP/UDP Port No.,]
[         allocated data rate,]
[      allocated DSCP code No. etc.]

Furthermore, as described above, when the transaction code is not used, the USI server 164 need not separately operate the transaction log database 911. That is, the USI server 164 can achieve the same operation as that in the case of using the transaction code, by using an ISP/ICP A/S server instead of the transaction code in transmitting/receiving a message. Then, since the transaction log database 911 is not operated, the load of the USI server 164 is reduced that much.

Hereinafter, internal structures of the billing server 169 is described with reference to FIGS. 14A and 14B.

Figure 14A:
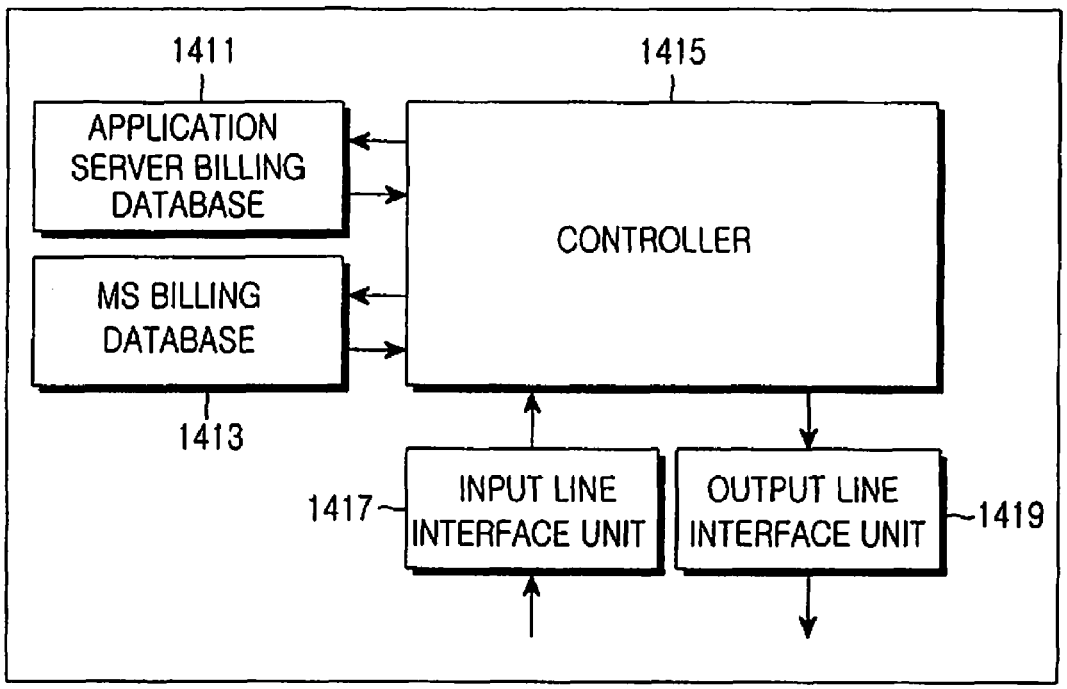
FIGS. 14A and 14B are block diagrams illustrating internal structures of the USI server 169 according to the present invention.
Figure 14B:
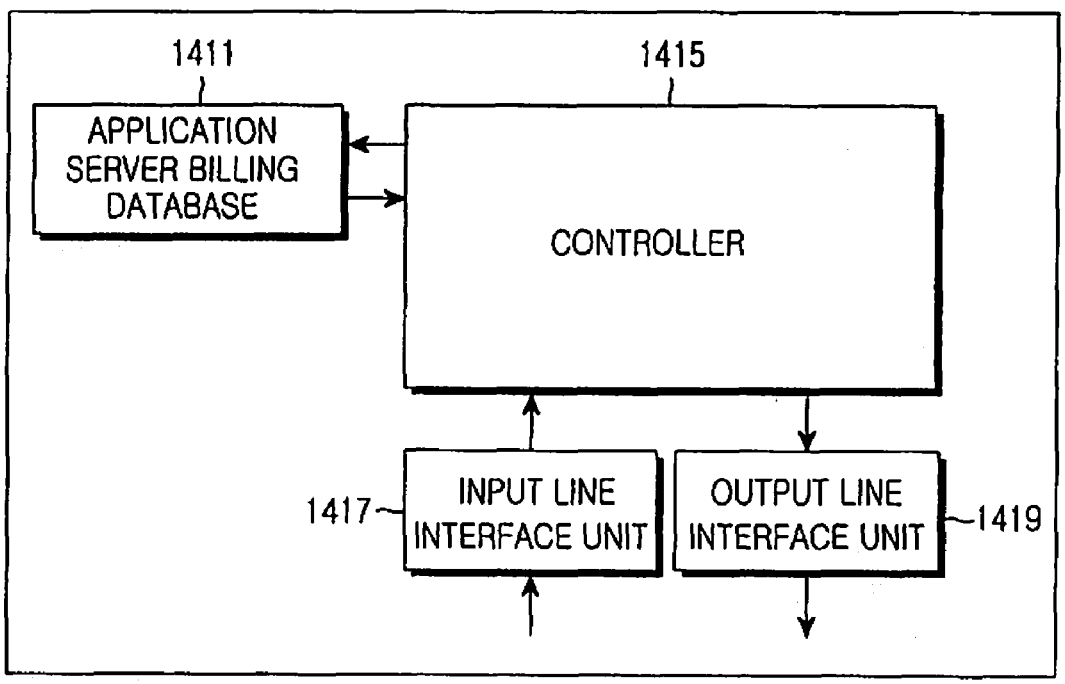

FIGS. 14A and 14B are block diagrams illustrating internal structures of the USI server 169.

The internal structure of the USI server 169 shown in FIG. 14A corresponds to an internal structure in the case of taking the billing to not only the application server 200 but also the MS 170 into consideration, and the internal structure of the USI server 169 shown in FIG. 14B corresponds to an internal structure in the case of taking only the billing to the application server 200 into consideration.

In FIG. 14A, the billing server 169 includes an application server billing database 1411, an MS billing database 1413, a controller 1415, an input line interface unit 1417, and an output line interface unit 1419.

The input line interface unit 1417 and the output line interface unit 1419 provide interfaces between internal servers of the mobile communication system 160, such as the USI server 164. Further, the application server billing database 1411 stores billing information to the application server 200 performed under the control of the controller 1415. As described above, billing discussed in the present invention is based on the ID of the application server 200 and is thus made to the application server 200. However, because the mobile communication system 160 may collectively control the billing to all the application servers within the mobile communication system 160, it is of course possible to perform the billing based on the ID (i.e. the ISP/ICP ID) of the mobile communication system 160 itself instead of the ID of the application server 200. The MS billing database 1413 stores billing information to the MS 170 performed under the control of the controller 1415.

In FIG. 14B, the billing server 169 includes an application server billing database 1411, a controller 1415, an input line interface unit 1417, and an output line interface unit 1419. As described in FIG. 14B, the billing server 169 taking only the billing to the application server 200 into consideration does not include the MS billing database 413.

An internal information structure of the application server billing database 1411 shown in FIGS. 14A and 14B is described below with reference to FIG. 15.

FIG. 15 illustrates an internal information structure of the application server billing database 1411 of FIGS. 14A and 14B.

In FIG. 15, the application server billing database 1411 includes an application server ID area, a transaction type area, a date/time area, and a detail information area. A corresponding event, that is, a type of a corresponding transaction is recorded in the transaction type area, and a date/time at which the billing is performed according to the corresponding event is recorded in the date/time area.

Hereinafter, an operation of the billing server 169 is described with reference to FIG. 16.

Figure 16:
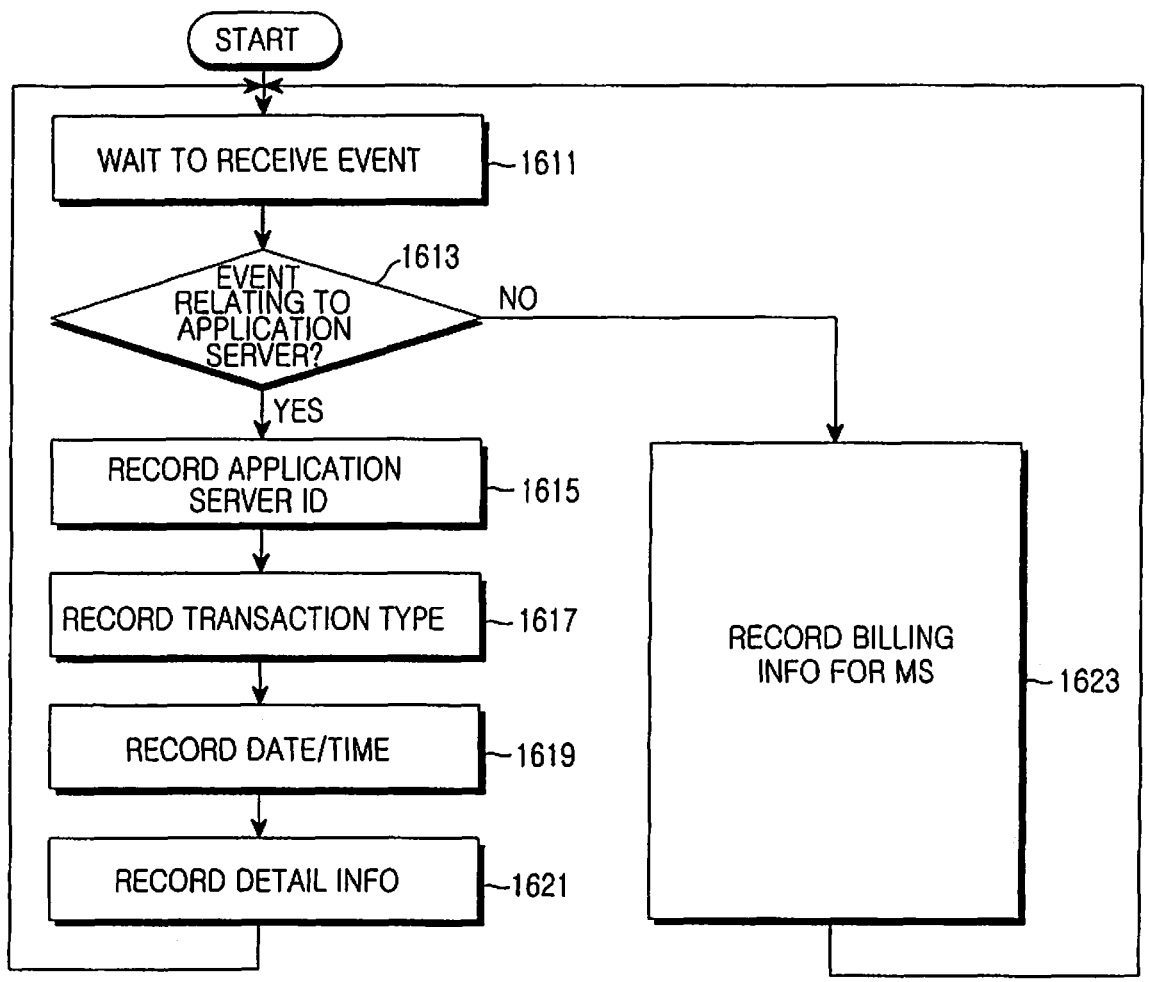
FIG. 16 is a flowchart illustrating a process of the billing server 169 according to the present invention.

FIG. 16 is a flow diagram illustrating a process of the billing server 169.

In FIG. 16, the billing server 169 is waiting to receive an event in step 1611. Then, in step 1613, when the billing server 169 receives an event, the billing server 169 determines if the event relates to the application server 200. As a result of the determination, when the received event relates to the application server 200, the billing server 169 proceeds to step 1615. In step 1615, the billing server 169 analyzes the received event and records an ID of the application server 200 in the application server ID area of the application server billing database 1411.

Then, in step 1617, the billing server 169 records the transaction type of the received event in the transaction type area of the application server billing database 1411. Then, in step 1619, the billing server 169 records the data/time information of the received event in the data/time area of the application server billing database 1411. Then, in step 1621, the billing server 169 records the detail information of the received event in the detail information area of the application server billing database 1411, and then returns to step 1611.

As a result of the determination, when the received event does not relate to the application server 200, that is, when the received event relates to the MS 170, the billing server 169 proceeds to step 1623. In step 1623, the billing server 169 records the billing information for the MS 170 in the MS billing database 1413, and then returns to step 1611.

As described above, the present invention enables service interfacing between a mobile communication system and an Internet service/content providing system. That is, the present invention enables a mobile communication system to use Internet service/content related information managed by an Internet service/content providing system, and enables an Internet service/content providing system to use mobile communication related information managed by a mobile communication system. Therefore, the present invention enhances services that can be provided by the mobile communication system and the Internet service/content providing system. Further, the enhancement in services provided by the mobile communication system and the Internet service/content providing system through the interfacing between the mobile communication system and the Internet service/content providing system results in changing of the service types of corresponding service providers, thereby yielding additional economic effects therefrom.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for interfacing in a communication system, the method comprising the steps of:
   (1) receiving, by a Universal Service Interface (USI) server, an event, which is processed according to information managed by a second system providing a second service, from a first system providing a first service; and
   (2) providing, by the USI server, in response to the received event, an interface between the first system and the second system in order to provide the received event to the second system so that the second system processes the event according to the information corresponding to a mobile station and managed by the second system, wherein, when the first system is an Internet Service/Content Provider (IS/CP) system comprising an application server, the second system is a mobile communication system that includes the USI server, and the event is an authentication request message, step (2) comprises:

performing authentication of the application server by the USI server; and transmitting an authentication response message including a result of the authentication to the application server by the USI server, wherein the authentication request message comprises fields defined by:

| Field | Data Type |
|---|---|
| ISPname | String |
| Account | String |
| Password | String | wherein a data type of the Internet Service Provider (ISP) name field, the Account field, and the Password field is string, the ISP name indicates a name of the application server having transmitted the request for authentication to the USI server, the Account indicates an account of the mobile station, and the Password indicates a password of the mobile station, and the authentication response message includes a field defined by:

| Field | Data Type |
|---|---|
| resultCode | Integer | wherein a data type of the resultCode field is integer, and the resultCode indicates the result of the authentication performed by the USI server.

2. The method of claim 1, wherein, when the event is a location information request message, step (2) comprises:

retrieving, by the USI server, location information of the mobile station, which is indicated by the location information request message; and transmitting a location information response message including a result of the location information retrieval to the application server by the USI server, wherein the location information request message comprises fields defined by:

| Field | Data Type |
|---|---|
| userIDtype | String |
| UserID | String |
| requestType | String |
| ChargingFlag | Number | wherein a data type of the userIDtype field, the userID field, and the requestType field is string, a data type of the ChargingFlag field is number, the userIDtype field indicates an Internet Protocol (IP) address of the mobile station, the userID field indicates an IDentifier (ID) of the mobile station, the requestType field indicates a type of a service, and the ChargingFlag field is a flag indicating an object of billing, and the location information response message comprises a field defined by:

| Field | Data Type |
|---|---|
| geographicInfo | String | wherein a data type of the geographicInfo field is string, and the geographicInfo field indicates information on an area in which the mobile station is located.

3. The method of claim 1, wherein, when the event is a device information request message, step (2) comprises:

retrieving, by the USI server, device information of the mobile station, which is indicated by the device information request message; and transmitting a device information response message including a result of the device information retrieval to the application server by the USI server, wherein the device information request message comprises fields defined by:

| Field | Data Type |
|---|---|
| userIDtype | String |
| UserID | String |
| ChargingFlag | Number | wherein a data type of the userIDtype field and the userID field is string, a data type of the ChargingFlag field is number, the userIDtype field indicates an Internet Protocol (IP) address of the mobile station, the userID field indicates an identifier (ID) of the mobile station, and the ChargingFlag field is a flag indicating an object of billing, and the device information response message comprises fields defined by:

| Field | Data Type |
|---|---|
| deviceType | String |
| deviceVendor | String |
| deviceModel | String |
| deviceOSVersion | String |
| deviceTotalMemory | String |
| deviceFreeMemory | String |
| deviceResolution | String |
| MACAddress | String |
| IPAddress | String |
| phoneNumber | String |
| connectivitySupported | String |
| currentConnectivity | String |
| defaultWebBrowserType | String |
| defaultWebBrowserVersion | String | wherein a data type of all the fields in the device information response message is string, the deviceType indicates the type of the mobile station, the deviceVendor indicates a vendor of the mobile station, the deviceModel indicates model information of the mobile station, the deviceOSVersion indicates version information of an Operating System (OS) used by the mobile station, the deviceTotalMemory indicates a total memory size of the mobile station, the deviceFreeMemory indicates a memory size that can be currently used by the mobile station, the deviceResolution indicates a resolution of the mobile station, the MACAddress indicates a Medium Access Control (MAC) address of the mobile station, the IPAddress indicates a current Internet Protocol (IP) address of the mobile station, the phoneNumber indicates a phone number of the mobile station, the connectivitySupported indicates a connectivity usable by the mobile station, the currentConnectivity indicates a connectivity currently usable by the mobile station, the defaultWebBrowserType indicates a basic web browser type of the mobile station, and the default WebBrowserVersion indicates a basic web browser version of the mobile station.

4. The method of claim 1, wherein, when the event is a Quality of Service (QoS) policy request message, step (2) comprises:

retrieving, by the USI server, a QoS policy of the mobile station, which is indicated by the QoS policy request message; and transmitting a QoS policy response message including a result of the QoS policy retrieval to the application server by the USI server, wherein the QoS policy request message comprises fields defined by:

| Field name | Type | Remark |
| --- | --- | --- |
| SessionID | Number | Use to correlation the Reserved and Terminated operation in same service. |
| UserIDtype | string | IPAddress |
| UserID field | string | |
| requestType | string | Reserved |
| srcIPAddress | string | IP address of IPTV server |
| SrcPort | Number | Port of IPTV server |
| destIPAddress | string | IP address of User |
| destPort | Number | Port of User |
| serviceType | string | A: VoIP/VT with silence suppression B: IPTV C: IM D~F: reserved |
| Direction | string | 0: Uplink, 1: downlink, 2: both |
| Charging Flag | Number | 1: ISP charging 2: Subscriber Charging | wherein a data type of the SessionID field, the srcPort field, the destPort field, and the Charging Flag field is number, a data type of the other fields is string, the SessionID indicates an IDentifier (ID) of a corresponding session, the requestType indicates "Reserved" or "Terminated," the srcIPAddress indicates an Internet Protocol (IP) address of the application server providing the service, the srcPort indicates a port of the application server providing the service, the destIPAddress indicates an IP address of the mobile station, the destPort indicates a port of the mobile station, the serviceType indicates the type of the provided service, the direction indicates a QoS support direction, the requestType implies a message requesting to start a QoS service when the requestType is "Reserved," and the requestType implies a message requesting to terminate the QoS service when the requestType is "Terminated," and the QoS policy response message comprises a field defined by:

| Field | Data Type |
| --- | --- |
| ResultCode | Integer | wherein a data type of the resultCode field, the data type of which is integer, and the resultCode field indicates whether it is possible to provide a QoS policy for the QoS policy request message.

5. The method of claim 1, wherein, when the event is a service alert request message, step (2) comprises:

determining, by the USI server, whether it is possible to page the mobile station, which is indicated by the service alert request message; and transmitting a service alert response message including a result of the determination to the application server by the USI server, wherein the service alert request message comprises fields defined by:

| Field | Data Type |
| --- | --- |
| userIDtype | String |
| UserID | String |
| calleeIDType | String |
| calleeID | String |
| applicationType | String |
| ChargingFlag | Number | wherein a data type of the userIDtype field, the userID field, the calleeIDType field, the calleeID field, and the applicationType field is string, a data type of the ChargingFlag field is number, the userIDtype indicates an Internet Protocol (IP) address of a mobile station requesting the paging, the userID indicates an identifier (ID) of the mobile station requesting the paging, the calleeIDType indicates an IP address of the mobile station receiving the paging, the calleeID indicates an ID of the mobile station receiving the paging, and the applicationType indicates the type of a used messenger, and the service alert response message comprises a field defined by:

| Field | Data Type |
| --- | --- |
| ResultCode | Integer | wherein a data type of the resultCode field is integer, and the resultCode field indicates whether it is possible to provide paging for the service alert request message.

6. An apparatus for interfacing in a communication system, the apparatus comprising:

a service interface server for receiving an event, which is processed according to information that corresponds to a mobile station and is managed by a second system providing a second service, from a first system providing a first service, and, in response to the received event, providing an interface between the first system and the second system in order to provide the received event to the second system so that the second system processes the event according to the information corresponding to the mobile station and managed by the second system, wherein, when the first system is an Internet Service/Content Provider (IS/CP) system including an application server, the second system is a mobile communication system including a Universal Service Interface (USI) server, and the event is an authentication request message, the USI server performs authentication of the application server, and transmits an authentication response message including a result of the authentication to the application server, wherein the authentication request message comprises fields defined by:

| Field | Data Type |
|---|---|
| ISPname | String |
| Account | String |
| Password | String | wherein a data type of the Internet Service Provider (ISP) name field, the Account field, and the Password field is string, the ISPname indicates a name of the application server having transmitted the request for authentication to the USI server, the Account indicates an account of the mobile station, and the Password indicates a password of the mobile station, and the authentication response message includes a field defined by:

| Field | Data Type |
|---|---|
| resultCode | Integer | wherein a data type of the resultCode field is integer, and the resultCode indicates the result of the authentication performed by the USI server.

7. The apparatus of claim 6, wherein, when the event is a location information request message, the USI server retrieves location information of the mobile station, which is indicated by the location information request message, and transmits a location information response message including a result of the location information retrieval to the application server, wherein the location information request message comprises fields defined by:

| Field | Data Type |
|---|---|
| userIDtype | String |
| UserID | String |
| requestType | String |
| ChargingFlag | Number | wherein a data type of the userIDtype field, the userID field, and the requestType field is string, a data type of the ChargingFlag field is number, the userIDtype field indicates an Internet Protocol (IP) address of the mobile station, the userID field indicates an IDentifier (ID) of the mobile station, the requestType field indicates the type of a service, and the ChargingFlag field is a flag indicating an object of billing, and the location information response message comprises a field defined by:

| Field | Data Type |
|---|---|
| geographicInfo | String | wherein a data type of the geographicInfo field is string, and the geographicInfo field indicates information on an area in which the mobile station is located.

8. The apparatus of claim 6, wherein, when the event is a device information request message, the USI server retrieves device information of the mobile station, which is indicated by the device information request message, and transmits a device information response message including a result of the device information retrieval to the application server, wherein the device information request message comprises fields defined by:

| Field | Data Type |
|---|---|
| userIDtype | String |
| UserID | String |
| ChargingFlag | Number | wherein a data type of the userIDtype field and the userID field is string, a data type of the ChargingFlag field is number, the userIDtype field indicates an Internet Protocol (IP) address of the mobile station, the userID field indicates an IDentifier (ID) of the mobile station, and the ChargingFlag field is a flag indicating an object of billing, and the device information response message comprises fields defined by:

| Field | Data Type |
|---|---|
| deviceType | String |
| deviceVendor | String |
| deviceModel | String |
| deviceOSVersion | String |
| deviceTotalMemory | String |
| deviceFreeMemory | String |
| deviceResolution | String |
| MACAddress | String |
| IPAddress | String |
| phoneNumber | String |
| connectivitySupported | String |
| currentConnectivity | String |
| defaultWebBrowserType | String |
| defaultWebBrowserVersion | String | wherein a data type of all the fields in the device information response message is string, the deviceType indicates the type of the mobile station, the deviceVendor indicates a vendor of the mobile station, the device-Model indicates model information of the mobile station, the deviceOSVersion indicates version information of an Operating System (OS) used by the mobile station, the deviceTotalMemory indicates a total memory size of the mobile station, the deviceFreeMemory indicates a memory size that can be currently used by the mobile station, the deviceResolution indicates a resolution of the mobile station, the MACAddress indicates a Medium Access Control (MAC) address of the mobile station, the IPAddress indicates a current IP address of the mobile station, the phoneNumber indicates a phone number of the mobile station, the connectivitySupported indicates a connectivity usable by the mobile station, the currentConnectivity indicates a connectivity currently usable by the mobile station, the defaultWebBrowser-Type indicates a basic web browser type of the mobile station, and the default WebBrowserVersion indicates a basic web browser version of the mobile station.

9. The apparatus of claim 6, wherein, when the event is a Quality of Service (QoS) policy request message, the USI server retrieves a QoS policy of the mobile station, which is indicated by the QoS policy request message, and transmits a QoS policy response message including a result of the QoS policy retrieval to the application server, wherein the QoS policy request message comprises fields defined by:

| Field name | Type | Remark |
| --- | --- | --- |
| SessionID | Number | Used to correlate the Reserved and Terminated operation in same service. |
| UserIDtype | string | IPAddress |
| UserID field | string | |
| requestType | string | Reserved |
| srcIPAddress | string | IP address of IPTV server |
| srcPort | Number | Port of IPTV server |
| destIPAddress | string | IP address of User |
| destPort | Number | Port of User |
| serviceType | string | A: VoIP/VT with silence suppression<br>B: IPTV<br>C: IM<br>D~F: reserved |
| Direction | string | 0: Uplink, 1: downlink, 2: both |
| Charging Flag | Number | 1: ISP charging<br>2: Subscriber Charging | wherein a data type of the SessionID field, the srcPort field, the destPort field, and the Charging Flag field is number, a data type of the other fields is string, the SessionID indicates an identifier (ID) of a corresponding session, the requestType indicates "Reserved" or "Terminated," the srcIPAddress indicates an Internet Protocol (IP) address of the application server providing the service, the srcPort indicates a port of the application server providing the service, the destIPAddress indicates an IP address of the mobile station, the destPort indicates a port of the mobile station, the serviceType indicates the type of the provided service, the direction indicates a QoS support direction, the requestType implies a message requesting to start a QoS service when the requestType is "Reserved," and the requestType implies a message requesting to terminate the QoS service when the requestType is "Terminated," and the QoS policy response message comprises a field defined by:

| Field | Data Type |
| --- | --- |
| ResultCode | Integer | wherein a data type of the resultCode field, the data type of which is integer, and the resultCode field indicates whether it is possible to provide a QoS policy for the QoS policy request message.

10. The apparatus of claim 6, wherein, when the event is a service alert request message, the USI server determines whether it is possible to page a mobile station indicated by the service alert request message, and then transmits a service alert response message including a result of the determination to the application server, wherein the service alert request message comprises fields defined by:

| Field | Data Type |
| --- | --- |
| userIDtype | String |
| UserID | String |
| calleeIDType | String |
| calleeID | String |
| applicationType | String |
| ChargingFlag | Number | wherein a data type of the userIDtype field, the userID field, the calleeIDType field, the calleeID field, and the applicationType field is string, a data type of the ChargingFlag field is number, the userIDtype indicates an Internet Protocol (IP) address of a mobile station requesting the paging, the userID indicates an IDentifier (ID) of the mobile station requesting the paging, the calleeIDType indicates an IP address of the mobile station receiving the paging, the calleeID indicates an ID of the mobile station receiving the paging, and the applicationType indicates the type of a used messenger, and the service alert response message comprises a field defined by:

| Field | Data Type |
| --- | --- |
| ResultCode | Integer | wherein a data type of the resultCode field is integer, and the resultCode field indicates whether it is possible to provide paging for the service alert request message.

* * * * *